United States Patent
Hockin et al.

(10) Patent No.: US 12,032,748 B1
(45) Date of Patent: Jul. 9, 2024

(54) DEVICES AND METHODS FOR ACTIVATING AN ASSET TRACKER

(71) Applicant: Geotab Inc., Oakville (CA)

(72) Inventors: Robert Spencer Hockin, Milton (CA); Farzan Farhangian, Toronto (CA); Yongkyun Shin, Oakville (CA); Stephan Edelman, Mississauga (CA); Jonathan Bean, Arvada, CO (US); Joseph James Deppong, Vernon Hills, IL (US); Andrew James Murfin, Denver, CO (US); Michael Pirruccio, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/515,554

(22) Filed: Nov. 21, 2023

Related U.S. Application Data

(60) Provisional application No. 63/598,646, filed on Nov. 14, 2023.

(51) Int. Cl.
*G06F 3/01* (2006.01)
*G06F 3/0346* (2013.01)
*G06F 3/044* (2006.01)

(52) U.S. Cl.
CPC ............ *G06F 3/017* (2013.01); *G06F 3/0346* (2013.01); *G06F 3/044* (2013.01)

(58) Field of Classification Search
CPC ......... G06F 3/017; G06F 3/0346; G06F 3/044
See application file for complete search history.

(56) References Cited

U.S. PATENT DOCUMENTS

| | | | | |
|---|---|---|---|---|
| 5,491,486 A | * | 2/1996 | Welles, II | G01S 5/0009 |
| | | | | 701/490 |
| 5,579,013 A | * | 11/1996 | Hershey | G01S 5/0027 |
| | | | | 342/357.4 |
| 6,507,786 B2 | | 1/2003 | Flick | |
| 6,703,946 B2 | | 3/2004 | Flick | |
| 6,809,659 B2 | | 10/2004 | Flick et al. | |
| 10,061,033 B2 | * | 8/2018 | Turon | G01S 19/34 |
| 10,403,104 B2 | * | 9/2019 | Kangralkar | G08B 13/14 |
| 10,748,395 B2 | * | 8/2020 | Kangralkar | G08B 13/14 |
| 10,908,666 B2 | * | 2/2021 | Wang | G06F 1/3228 |
| 11,195,184 B1 | * | 12/2021 | Dixon | G06Q 30/0185 |
| 11,487,019 B2 | * | 11/2022 | Turon | G01S 19/34 |
| 11,675,042 B1 | | 6/2023 | Lloyd et al. | |
| 11,709,500 B2 | | 7/2023 | Lloyd et al. | |
| 11,736,312 B1 | | 8/2023 | Xiao et al. | |
| 11,741,479 B1 | * | 8/2023 | Dixon | H04W 4/029 |
| | | | | 705/4 |
| 11,838,884 B1 | | 12/2023 | Dergosits et al. | |
| 11,888,716 B1 | | 1/2024 | Lloyd | |
| 11,974,410 B1 | | 4/2024 | Lin et al. | |
| 2007/0015548 A1 | | 1/2007 | Flick | |
| 2012/0161958 A1 | * | 6/2012 | Turon | G01S 19/34 |
| | | | | 340/539.3 |

(Continued)

*Primary Examiner* — Michael Pervan
(74) *Attorney, Agent, or Firm* — Sherif A. Abdel-Kader

(57) ABSTRACT

A method of activating an asset tracker from an ultra-low power shipping mode to a motion detection mode. The method includes detecting an activation trigger activity including double-tapping on the housing of the asset tracker, mid-air gestures comprising orientation changes, touch sensing, optical sensing, and loss of proximity with a proximity object in the packaging of the asset container.

15 Claims, 19 Drawing Sheets

(56) References Cited

U.S. PATENT DOCUMENTS

| | | | |
|---|---|---|---|
| 2017/0269220 A1* | 9/2017 | Turon | G01S 19/34 |
| 2019/0057586 A1* | 2/2019 | Kangralkar | H04W 4/029 |
| 2019/0340901 A1* | 11/2019 | Kangralkar | G08B 13/14 |
| 2020/0193740 A1 | 6/2020 | Sabina | |
| 2020/0379125 A1* | 12/2020 | Turon | G01S 19/34 |
| 2021/0255334 A1* | 8/2021 | Turon | G01S 19/34 |
| 2023/0138858 A1 | 5/2023 | Bhardwaj et al. | |
| 2024/0063596 A1 | 2/2024 | Pandian et al. | |

\* cited by examiner

DEVICES AND METHODS FOR ACTIVATING AN ASSET TRACKER

RELATED APPLICATIONS

The present application claims priority from U.S. provisional application 63/598,646 filed on Nov. 14, 2023, the contents of which are herein incorporated by reference in their entirety.

FIELD

The present disclosure generally relates to asset tracking, and more specifically to devices and methods for activating an asset tracker.

BACKGROUND

An asset tracker is an electronic device deployed in an asset for tracking the location and condition thereof. An asset tracker is typically part of an asset tracking system. An asset tracking system enables tracking the location and condition of one or more assets. An asset may be a vehicle, a piece of equipment, a shipping container, a trailer, a tank, or any other type of asset whose location and condition is to be tracked. An asset tracker is coupled to the asset and deployed in the field. A battery-powered asset tracker has limited electric energy for operation.

SUMMARY

In one aspect of the present disclosure, there is provided a method for activating an asset tracker. The asset tracker includes a housing for enclosing internal components of the asset tracker, the internal components including a controller, an inertial measurement unit, and at least one peripheral. The method comprising operating the controller of the asset tracker is in low-power mode, maintaining the at least one peripheral in a powered off state, configuring an activation detection module of the asset tracker for detecting an activation trigger activity, and in response to detecting the activation trigger activity activating a motion detection mode of the asset tracker for detecting a sustained motion for a predetermined duration.

Activating the motion detection mode may comprise configuring the inertial measurement unit for detecting the sustained motion for the predetermined duration.

The inertial measurement unit may comprise a 3-axis accelerometer and configuring the inertial measurement unit for detecting the sustained motion may comprise configuring the 3-axis accelerometer to notify the controller when the 3-axis accelerometer detects an acceleration value above an acceleration threshold for the predetermined duration.

The activation detection module may comprise the inertial measurement unit, configuring the activation detection module for detecting the activation trigger activity may comprise configuring the inertial measurement unit for detecting at least one tapping activity in a direction of an axis substantially perpendicular to a surface of the housing, and detecting the activation trigger activity may comprise detecting by the inertial measurement unit the at least one tapping activity on the surface of the housing.

The at least one tapping activity may comprise a first tapping activity and a second tapping activity spaced in time from the first tapping activity.

The first tapping activity and the second tapping activity may each comprise a double tap on the surface of the housing.

The activation detection module may comprise the inertial measurement unit, and detecting the activation trigger activity may comprise detecting at least one mid-air gesture.

The at least one mid-air gesture may comprise a first mid-air gesture and a second mid-air gesture different from the first mid-air gesture. Configuring the activation detection module for detecting the activation trigger activity may comprise configuring the inertial measurement unit for detecting the first mid-air gesture and configuring the inertial measurement unit for detecting the second mid-air gesture in response to detecting the first mid-air gesture.

Configuring the inertial measurement unit for detecting the first mid-air gesture may comprise configuring the inertial measurement unit for detecting at least one orientation change along a first axis of the asset tracker and configuring the inertial measurement unit for detecting the second mid-air gesture comprises configuring the inertial measurement unit for detecting at least one orientation change along a second axis of the asset tracker.

The at least one orientation change may comprise a first rotation from an initial orientation by a first angle exceeding a particular threshold angle around the respective axis, and a second rotation by a second angle exceeding the particular angle threshold back to the initial orientation.

The activation detection module may comprise a proximity sensor and detecting the activation trigger activity may comprise detecting, by the proximity sensor, a loss of proximity between the asset tracker and a proximity object disposed in a packaging of the asset tracker.

The proximity sensor may comprise a Hall Effect sensor and the proximity object may comprise a magnet.

The proximity sensor may comprise a reed switch and the proximity object may comprise a magnet.

The activation detection module may comprise an optical sensor, and detecting the activation trigger activity may comprise detecting incident light on the optical sensor.

The activation detection module may comprise a touch sensor, and detecting the activation trigger activity may comprise detecting a touch by a human finger on the touch sensor.

The touch sensor may comprise a capacitive touch sensor.

The at least one peripheral may comprise a location module.

In another aspect of the present disclosure, there is provided an asset tracker. The asset tracker comprises a housing, a controller disposed in the housing, an activation detection module disposed in the housing and couplable to the controller, a location module disposed in the housing and coupled to the controller, an inertial measurement unit disposed in the housing and coupled to the controller, and a memory coupled to the controller. The memory stores machine-executable programming instructions which, when executed by the controller, configure the asset tracker to operate the controller of the asset tracker is in low-power mode, maintain the location module in a powered off state, configure the activation detection module of the asset tracker to detect an activation trigger activity, and in response to detecting the activation trigger activity, configure the inertial measurement unit to detect a sustained motion for a predetermined duration.

The activation detection module may comprise the inertial measurement unit, and the machine-executable programming instructions which configure the activation detection module to detecting the activation trigger activity may comprise machine-executable programming instructions which configure the inertial measurement unit to detect at least one tapping activity in a direction of an axis substantially perpendicular to a surface of the housing.

The at least one tapping activity may comprise a first tapping activity and a second tapping activity spaced in time from the first tapping activity.

The first tapping activity and the second tapping activity may each comprise a double tap on the surface of the housing.

The activation detection module may comprise the inertial measurement unit, and the machine-executable programming instructions which configure the activation detection module to detect the activation trigger activity may comprise machine-executable programming instructions which configure the inertial measurement unit to detect at least one mid-air gesture.

The at least one mid-air gesture may comprise a first mid-air gesture and a second mid-air gesture different from the first mid-air gesture, and the machine-executable programming instructions which configure the inertial measurement unit to detect the at least one mid-air gesture may comprise machine-executable programming instructions which configure the inertial measurement unit to detect the first mid-air gesture and in response to detecting the first mid-air gesture, configure the inertial measurement unit to detect the second mid-air gesture. The machine-executable programming instructions which configure the inertial measurement unit to detect the first mid-air gesture may comprise machine-executable programming instructions which configure the inertial measurement unit to detect at least one orientation change along a first axis of the asset tracker, and the machine-executable programming instructions which configure the inertial measurement unit to detect the second mid-air gesture may comprise machine-executable programming instructions which configure the inertial measurement unit to detect at least one orientation change along a second axis of the asset tracker.

The at least one orientation change may comprise a first rotation, from an initial orientation, by a first angle exceeding a particular threshold angle around the respective axis, and a second rotation by a second angle exceeding the particular angle threshold back to the initial orientation.

The activation detection module may comprise a proximity sensor, and the machine-executable programming instructions which configure the activation detection module to detect the activation trigger activity may comprise machine-executable programming instructions which configure the proximity sensor to detect a loss of proximity between the asset tracker and a proximity object disposed in a packaging of the asset tracker for more than a proximity loss threshold duration.

The proximity sensor may comprise a Hall Effect sensor and the proximity object may comprise a magnet.

The proximity sensor may comprise a reed switch and the proximity object may comprise a magnet.

The activation detection module may comprise an optical sensor, and the machine-executable programming instructions which configure the activation detection module to detect the activation trigger may comprise machine-executable programming instructions which configure the optical sensor to detect incident light for a predetermined duration.

The activation detection module may comprise a touch sensor, and the machine-executable programming instructions which configure the activation detection module to detect the activation trigger activity may comprise machine-executable programming instructions which configure the touch sensor to detect a touch by a human finger on the touch sensor.

The touch sensor may comprise a capacitive touch sensor.

BRIEF DESCRIPTION OF THE DRAWINGS

Exemplary non-limiting embodiments of the present disclosure are described with reference to the accompanying drawings in which.

DETAILED DESCRIPTION

Figure 1:
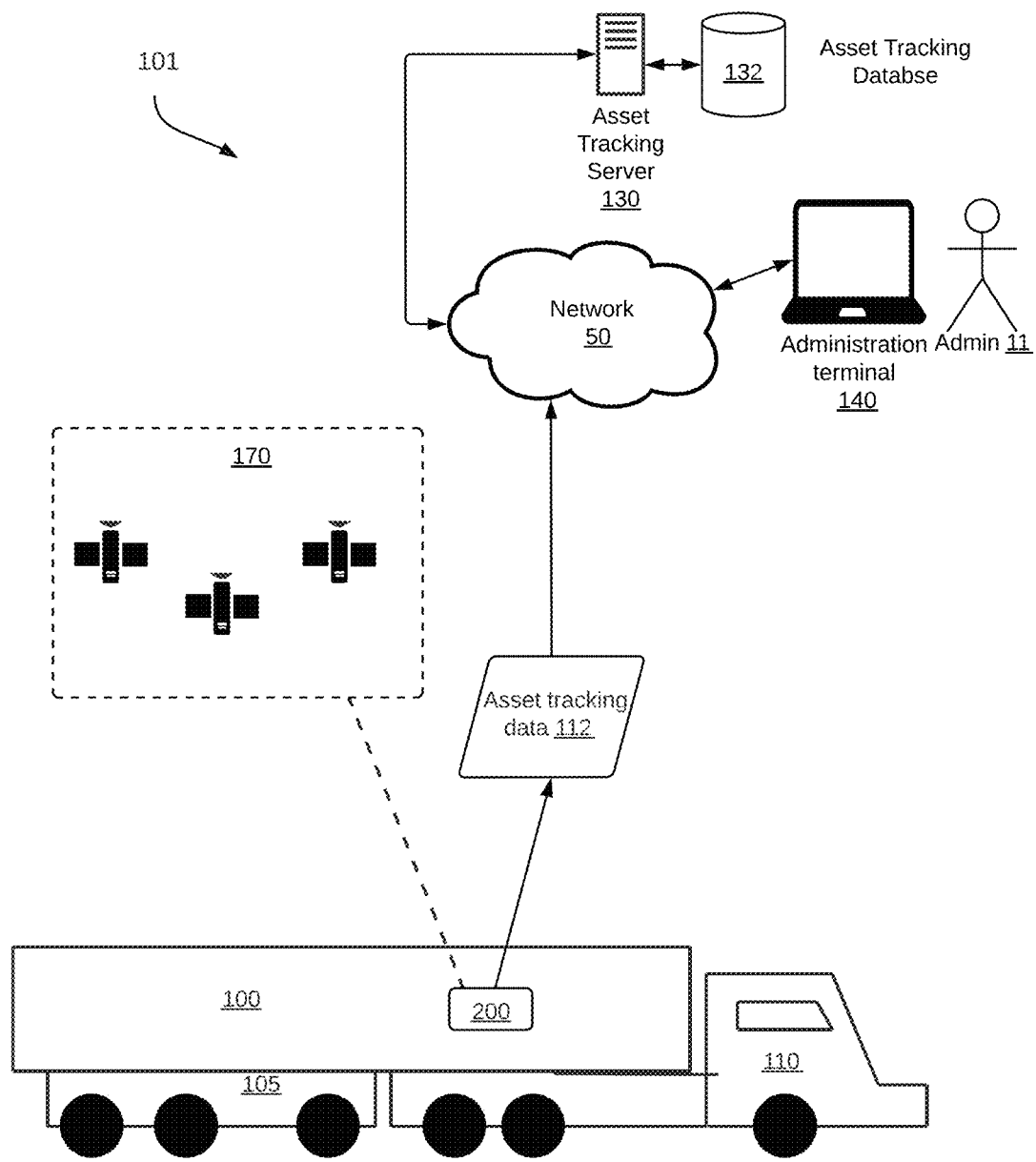
FIG. 1 is a schematic diagram of an asset tracking system including an asset tracker coupled to an engineless asset.

The present disclosure relates generally to asset tracking, and specifically to a device and a method for activating an asset tracker. More specifically, the present disclosure provides devices and methods for activating an asset tracker and enabling a motion detection mode thereon in response to an activation trigger activity.

An asset tracker is an electronic device deployed in an asset for tracking the location and condition thereof. An asset tracker is typically part of an asset tracking system. An asset tracking system allows an administrator to track the location and condition of one or more than one assets. An asset may be a vehicle, a piece of equipment, a shipping container, a trailer, a tank, or any other type of asset whose location and condition need to be tracked.

Asset trackers are typically powered by a battery. Some asset trackers are powered by a rechargeable battery coupled to an energy harvester, such as a solar panel. Other asset trackers are powered by a non-rechargeable battery. A non-rechargeable battery is a type of battery that cannot be recharged after it is depleted. Some common types of non-rechargeable batteries used in portable electronic devices, such as asset trackers, include zinc-carbon batteries and alkaline batteries. In this disclosure, a "battery-powered asset tracker" refers to an asset tracker powered by a non-rechargeable and non-replaceable battery. Once a battery-powered asset tracker is deployed in the field, the asset tracker works off of the non-rechargeable battery until the non-rechargeable battery is depleted. Some asset trackers have to be certified for ingress protection and therefore it is preferable that such asset trackers have a sealed housing and that the battery is not replaceable. Furthermore, a non-replaceable battery avoids the need for building a battery compartment, battery contacts, and the like thus reducing the cost.

Asset Tracking System

An asset tracking system facilitates tracking and monitoring the location, movement, and condition of various assets. An asset tracking system may be used in logistics, transportation, supply chain management, and other industries. Asset trackers are electronic devices that are coupled with assets to track and monitor the location, movement, and condition of the assets. An asset may be a vehicle, a valuable piece of equipment, a shipping container, a trailer, a tank, or any other type of asset whose location, movement, and condition need to be tracked. The asset tracker is an electronic device that contains at least one of a location module, an inertial measurement unit, and one or more sensors. The location module determines the location of the asset tracker, and hence the location of the asset. The inertial measurement unit (IMU) detects motion, orientation, and heading. The one or more sensors determine the conditions experienced by the asset tracker, such as temperature, pressure, noise, and the like. The asset tracker periodically communicates the location, movement, and/or conditions thereof to a remote server, such as an asset tracking server. Accordingly, the location, movement, and/or condition of the asset may be tracked in real-time or near real-time. The asset tracker captures the location thereof in real-time, but reports the location and/or other conditions to the remote server periodically in order to save power consumption. The asset tracker is also capable of identifying and recording a trip including the start time and the end time of the trip.

FIG. 1 shows a high-level block diagram of an asset tracking system 101. The asset tracking system 101 includes an asset tracker 200 deployed in an asset 100, a network 50, an asset tracking server 130, an administration terminal 140, and satellites 170. While a single instance of each element is shown for simplicity, multiple instances of each shown element are typical in an asset tracking system.

The asset 100 shown is in the form of a shipping container placed on a trailer 105 coupled to a tractor 110. The asset 100 may be a shipping container, a vehicle, industrial equipment, construction equipment, a tank holding a chemical, or any other asset whose location, movement, and/or condition needs to be tracked. The asset 100 may be transported by a trailer 105 as shown, or may be transported by a ship, a train, an airplane, or any other means of transportation. The asset 100 may also be a piece of industrial or construction equipment, such as a generator, a concrete mixer, a compressor, and the like. Such types of assets may have wheels and may be towed from one site to another.

The asset tracker 200 is an electronic device coupled to an asset, such as the asset 100. The asset tracker 200 is configured to track the location, movement, and/or condition of the asset 100.

In some implementations, the asset tracker 200 is powered by a battery. In other implementations, the asset tracker 200 is powered by a rechargeable battery and contains an energy harvester such as a solar panel for recharging the rechargeable battery. In the latter case, the asset tracker 200 is an example of an electronic device powered by a rechargeable battery and an energy harvester. The asset tracker 200 utilizes a Global Navigation Satellite System (GNSS) to obtain the location thereof. In the depicted embodiment, the asset tracker 200 is in communication with the satellites 170 to obtain the location thereof. The asset tracker 200 also contains an inertial measurement unit (IMU) and/or sensors such as temperature, light, and pressure sensors. The combination of location data, movement, and sensor data are termed asset tracking data 112. The asset tracker 200 connects to a network 50 which allows the asset tracker 200 to send the asset tracking data 112 to a remote server such as the asset tracking server 130.

The network 50 may be a single network or a combination of networks such as a data cellular network, a wide area network, the Internet, and other network technologies. The network 50 provides connectivity between the asset tracker 200 and the asset tracking server 130, and between the administration terminal 140 and the asset tracking server 130.

In some implementations of the asset tracking system 101, the network 50 is a cellular network utilizing cellular technology. In one implementation, the network 50 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network 50 uses the Third-generation (3G) cellular technology utilizing the Universal Mobile Telephone System (UMTS) supporting data transfer using the High Speed Packet Access (HSPA) protocol. In yet another implementation, the network 50 uses the Fourth-generation cellular technology (4G) which uses the Long Term Evolution (LTE) protocol. In another implementation, the network 50 uses the Fifth-generation (5G) cellular technology. In yet another implementation, the network 50 uses the Narrowband Internet of Things (NB-IoT) which is a low-power wide-area network (LPWAN) technology that is part of the Third Generation Partnership Project (3GPP) standard.

In some implementations of the asset tracking system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the IEEE 802.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations of the asset tracking system 101, the network 50 uses a wired network technology when the asset tracker 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

In some implementations, the network 50 is a combination of the above-specified technologies.

The asset tracking server 130 is an electronic device capable of executing machine-executable programming instructions for receiving, storing, and analyzing the asset tracking data 112. The asset tracking server 130 may be implemented as a single computer system or a cluster of computers. The asset tracking server 130 may utilize an operating system such as Linux, Windows, Unix, FreeBSD, macOS Server, VMware ESXI, Microsoft Hyper-V Server, Oracle Solaris, IBM AIX, or any other equivalent operating system. Alternatively, the asset tracking server 130 may be implemented on a cloud computing platform, such as Amazon Web Service (AWS), Microsoft Azure, Google Cloud Platform (GCP), IBM Cloud, Oracle Cloud, and Alibaba Cloud. The asset tracking server 130 is connected to the network 50 and may receive asset tracking data 112 from the asset tracker 200. The asset tracking server 130 may have a plurality of software modules for performing data analysis and analytics on the telematics data to obtain useful asset information about the assets 100. The asset tracking server 130 may be coupled to an asset tracking database 132 for storing telematics data and/or the results of the analytics which are related to the asset 100. The asset tracking server 130 may communicate the asset tracking data 112 pertaining to the asset 100 to the administration terminal 140.

The satellites 170 may be part of a global navigation satellite system (GNSS) which is a satellite-based navigation system that provides positioning, navigation, and timing services worldwide. The four primary GNSS systems in operation today are Global Positioning System (GPS), Global Navigation Satellite System (GLONASS), Galileo, and BeiDou. GPS was developed and operated by the United States, GLONASS is the Russian counterpart of GPS, Galileo is the European Union's GNSS, and BeiDou is the Chinese GNSS system. Other less commonly used GNSS systems are QZSS (Japan) and IRNSS or NavIC (India). The location information may be processed by a location module on the asset tracker 200 to provide location data indicating the location of the asset tracker 200 (and hence the location of the asset 100 coupled thereto). In other implementations (not shown), the asset tracker 200 may use other means to determine the location thereof as outlined below.

The administration terminal 140 is an electronic device capable of connecting to the asset tracking server 130, over the network 50. The administration terminal can be configured to retrieve data and analytics related to one or more assets 100; to receive alerts from the asset tracking server 130 in respect of one or more conditions on the asset tracker 200; or to issue commands to one or more asset tracker 200 via the asset tracking server 130. The administration terminal 140 is shown as a laptop computer, however, this is not necessarily the case. An administration terminal may be a desktop computer, an industrial human-machine interface (HMI), a touch screen panel, a table, a smartphone, an Augmented Reality (AR) headset, or a Network Operations Center (NOC). The administration terminal 140 may run a web browser or a custom application which allows retrieving data and analytics, pertaining to one or more assets 100, from the asset tracking server 130 via a web interface of the asset tracking server 130. The administration terminal 140 may also be used to issue commands to one or more asset tracker 200 via the asset tracking server 130. An administrator 11 may communicate with the asset tracking server 130 using the administration terminal 140. In addition to retrieving data and analytics, the administration terminal 140 allows the administrator 11 to set alerts and geofences for keeping track of the assets 100, receiving notifications of deliveries, and so on.

In operation, an asset tracker 200 is coupled to an asset 100 to capture the asset's location, motion and/or one or more conditions pertaining to the asset. The location data is determined by a location module in communication with the satellites 170. The motion data is determined by an inertial measurement unit that is part of the asset tracker 200 or coupled thereto. The one or more conditions are determined from sensor data gathered from sensors in the asset tracker 200 or external sensors coupled to the asset tracker 200. The combination of location data, motion data, and/or sensor data comprises the asset tracking data 112. The asset tracker 200 sends the asset tracking data 112 to the asset tracking server 130 over the network 50. The asset tracking server 130 may process, aggregate, and analyze the asset tracking data 112 to generate asset information pertaining to the asset 100. The asset tracking server 130 may store the asset tracking data 112 and/or the generated asset information in the asset tracking database 132. The administration terminal 140 may connect to the asset tracking server 130, over the network 50, to access the asset tracking data 112 and/or the generated asset information. Alternatively, the asset tracking server 130 may push the asset tracking data 112 and/or the generated asset information to the administration terminal 140. An administrator 11 may use the administration terminal 140 to set alerts for certain activities pertaining to the assets 100. When criteria for an alert is met, the asset tracking server 130 sends a message to the administration terminal 140 to notify the administrator 11. For example, when an asset is moved outside of a service area the asset tracking server 130 may send an alert message to the administration terminal 140. An administrator 11 may also use the administration terminal 140 to configure an asset tracker 200 by issuing commands thereto via the asset tracking server 130. For example, the asset tracking server 130 may issue a command to the asset tracker 200 to capture certain types of sensor data in response to certain conditions.

Asset Tracker

Figure 2:
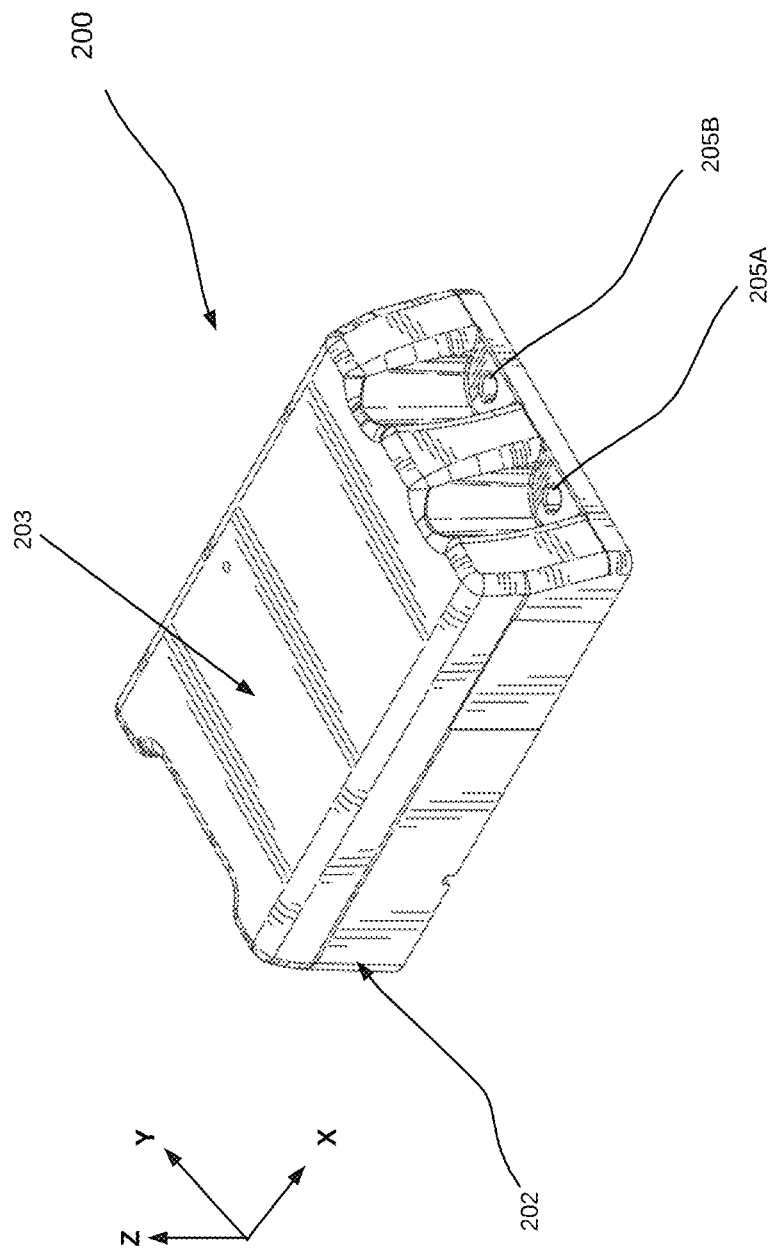
FIG. 2 is a perspective view of an exemplary battery-powered asset tracker.
Figure 3:
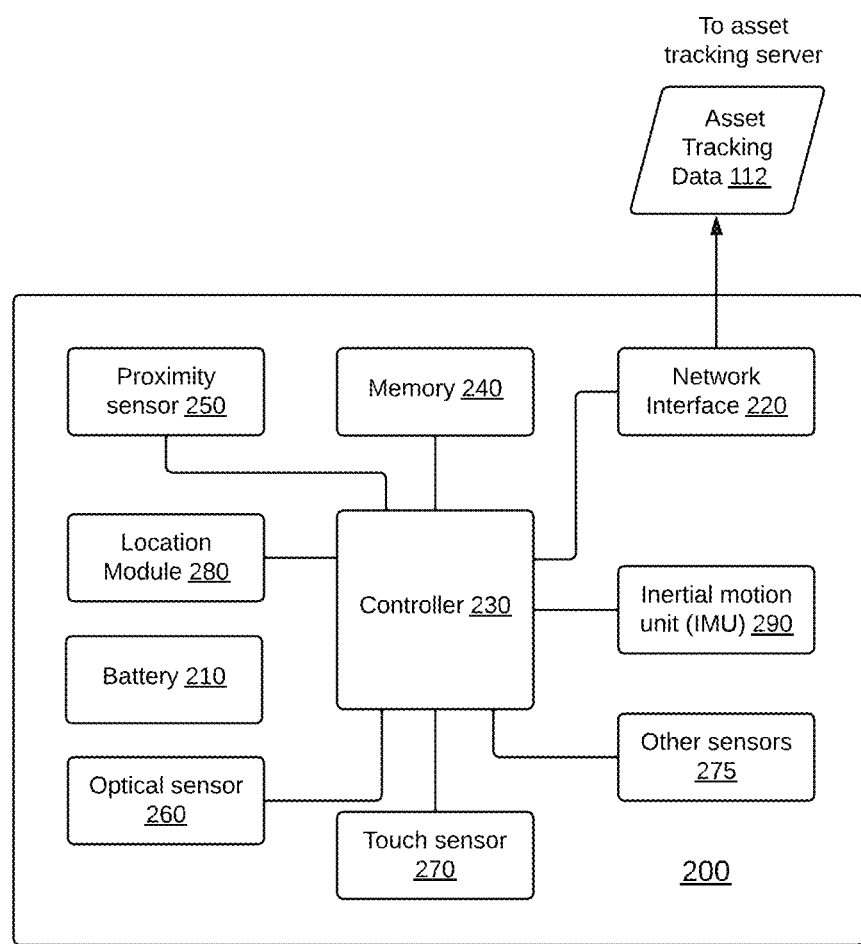
FIG. 3 is a block diagram of an exemplary battery-powered asset tracker.

Further details relating to the asset tracker 200 are shown with reference to FIG. 2 and FIG. 3. FIG. 2 is a perspective view of a battery-powered asset tracker in the form of the asset tracker 200, in accordance with embodiments of the present disclosure. The asset tracker 200 has a rugged enclosure in the form of the housing 202 for housing the internal components of the asset tracker 200. The housing 202 includes fastening holes 205A and 205B for fastening the battery-powered asset tracker FIG. 3 is a block diagram of an exemplary battery-powered asset tracker in the form of the asset tracker 200, in accordance with embodiments of the present disclosure.

The asset tracker 200 includes a controller 230. A plurality of peripherals are coupled to the controller 230 by different types of interfaces. The peripherals include a memory 240, a network interface 220, an IMU 290, a proximity sensor 250, a location module 280, an optical sensor 260, a touch sensor 270, and other sensors 275. The asset tracker 200 also includes a non-rechargeable battery in the form of the battery 210. Some of the peripherals shown are optional. For example, the asset tracker 200 may not include a proximity sensor 250, an optical sensor 260, a touch sensor 270, and/or other sensors 275.

The controller 230 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 230 may follow a Von Neumann Architecture, a Harvard Architecture, or a Modified Harvard Architecture. The controller 230 may be a Complex Instruction Set Computer (CISC) processor supporting a complex instruction set that can perform multiple operations in a single instruction. Alternatively, the controller 230 may be a Reduced Instruction Set Computer (RISC) processor having a simplified and streamlined instruction set, and employs a pipeline architecture to optimize execution. The controller 230 may have a single processor core or multiple processor cores supporting parallel execution of instructions. The controller 230 may have an internal memory for storing machine-executable programming instructions to be executed by the controller 230 to carry out the steps of the methods described in this disclosure.

The memory 240 is an electronic storage component that enables storage of data and machine-executable programming instructions. The memory 240 may be a read-only-memory (ROM) including a Programmable ROM (PROM), and Erasable Programmable ROM (EPROM), Electrically Erasable Programmable ROM (EEPROM), or Flash memory. The memory 240 may be a random access memory (RAM) including Static RAM (SRAM) and Dynamic RAM (DRAM). Alternatively, the memory 240 may be a Ferro-electric RAM (FRAM), a Magnetic Random Access Memory (MRAM), or a Phase-Change Memory (PCM). The memory 240 may also be any combination of the aforementioned types. The memory 240 is for storing machine-executable programming instructions and/or data to support the functionality described in this disclosure. The memory 240 is coupled to the controller 230, via a bus, thus enabling the controller 230 to execute the machine-executable programming instructions stored in the memory 240 and/or to access the data stored therein.

The location module 280 determines the location of the asset tracker 200. The location data may be in the form of a latitude and longitude, in Universal Transverse Mercator (UTM) coordinates, or any other similar form.

In some implementations, the location module 280 is a GNSS transceiver supporting one or more of the aforementioned GNSS technologies. The location module 280 may be integrated into the controller 230 or coupled to the controller 230 by a serial interface such as the Serial Peripheral Interface (SPI), the Inter-Integrated Circuit (I2C), Universal Asynchronous Receiver Transmitter (UART), Universal Serial Bus (USB), and Secure Digital Input/Output (SDIO).

In other implementations, the location module 280 determines the location of the asset tracker 200 from a cellular network using cell tower triangulation. In this case, the location module 280 is a firmware module that computes location based on information received from the network interface 220, which in this case is a cellular modem providing signal measurements from multiple nearby cell towers. The location module 280 uses the signal measurements to estimate the location of the asset tracker 200. The location data determined by the location module 280 is sent to the controller 230.

The proximity sensor 250 is an electronic component that can detect the presence of a nearby proximity object without any physical contact. In this disclosure, the proximity sensor 250 is used to determine whether the asset tracker 200 is in a shipping box or has been removed therefrom. In this disclosure, the proximity sensor 250 is a device that measures magnetic field, and the proximity object is a magnet deployed in the shipping box of the asset tracker 200. Examples of the proximity sensor 250 include a Hall Effect sensor, a reed switch, microelectromechanical systems (MEMS) magnetic field sensors, and Quantum sensors. The proximity sensor 250 may be integrated into the controller 230 or coupled thereto by a serial interface such as SPI, I2C, UART, USB, or SDIO.

The optical sensor 260 is an electronic component that can detect and/or measure light or other optical properties. Examples of optical sensors include, but are not limited to photodiodes, phototransistors, and photoresistors. Photodiodes are semiconductor devices that convert light into an electric current. Phototransistors are similar to photodiodes but have an internal gain. Photoresistors are passive components whose resistance changes with incident light intensity. The optical sensor 260 is coupled to the controller 230 and is configured to indicate to the controller 230 whether there is light incident on the optical sensor 260.

The touch sensor 270 is a touch-sensitive input device. In some implementations the touch sensor 270 is a capacitive touch sensor. Capacitive touch sensors work by making changes in capacitance in response to the sensor being touched by a human finger, for example.

The other sensors 275 may be one or more of: a temperature sensor, a pressure sensor, an optical sensor, a humidity sensor, a gas sensor, an acoustic sensor, a pH sensor, a soil moisture sensor, or any other suitable sensor indicating a condition pertaining to the asset 100 to which the asset tracker 200 is coupled. The sensors provide sensor data to the controller 230. Some controllers 230 may have some integrated sensors. In other cases, the other sensors 275 are coupled to the controller using a serial interface, such as SPI, I2C, UART, USB, or SDIO. Some asset trackers may not have any built-in sensors and may only provide location information and/or IMU information. Some asset trackers may have the capability of pairing with external sensors via a wired or a wireless interface.

The IMU 290 is an inertial measurement unit. The IMU 290 is a device used to measure and provide information about the asset tracker's motion, orientation, and acceleration. The IMU 290 may be comprised of several components working together. For example, the IMU 290 may be comprised of one or more of: an accelerometer, a gyroscope, a magnetometer, and a barometer. An accelerometer measures linear acceleration in three axes (typically X, Y, and Z). In some implementations, the IMU 290 is comprised of a 3-axis accelerometer. Such implementations are characterized by low-power consumption as accelerometers consume less power than, for example, gyroscopes. A gyroscope measures the angular velocity or rate of rotation around each of the three axes. A magnetometer measures the strength and direction of a magnetic field and thus determines the heading or orientation relative to the Earth's magnetic field. A barometer measures the atmospheric pressure and that can be used to estimate changes in altitude. Some IMUs contain a microcontroller or a processor that runs sensor fusion algorithms to combine and process the data from the various above-mentioned sensors. Some IMUs contain embedded machine learning cores (MLCs). An MLC is an in-sensor engine with a classification-based AI algorithm (decision tree) that can run different tasks while the sensors are detecting motion data. Examples of IMUs with MLCs include the iNEMO inertial modules by STMicroelectronics™. Other IMUs contain a communication interface to interface with an external microcontroller or processor. Some asset trackers may not contain an IMU unit and may report motion determined from the change in location reported by the location module 280.

The IMU 290 may have additional features such as detecting a tap, detecting an orientation change, and detecting a freefall. For example, the IMU 290 may be configured to detect a single tap or a double tap, and generate an interrupt signal to the controller 230. Additionally, the IMU 290 may be configured to detect an orientation change around any one of: the X-axis, the Y-axis, and the Z-axis. When an orientation change of a specific magnitude (e.g., 60 degrees or 90 degrees) is detected, the IMU 290 can generate an interrupt signal to the controller 230. The IMU 290 may be integrated into the controller 230 or may be a separate component that communicates with the controller 230 via a serial communications interface such as SPI, I2C, UART, USB, or SDIO. The controller 230 can configure the IMU 290 by sending configuration commands thereof. Additionally, the controller 230 can query the status of the IMU 290 generally or in response to receiving an interrupt signal therefrom. The IMU 290 can have low power modes for extending the battery life of the asset tracker. For example, low power modes are characterized by the accelerometers having a low output data rate (1 to 200 Hz) and the IMU 290 consuming current in the range of fractions of a micro-amp to a few micro amps.

In some implementations, the network interface 220 includes a cellular modem utilizing cellular technology. In one implementation, the network interface 220 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network interface 220 uses the Third-generation (3G) cellular technology utilizing the Universal Mobile Telephone System (UMTS) supporting data transfer using the High Speed Packet Access (HSPA) protocol. In yet another implementation, the network interface 220 uses the Fourth-generation cellular technology (4G) which uses the Long Term Evolution (LTE) protocol. In another implementation, the network interface 220 uses the Fifth-generation (5G) cellular technology. In yet another implementation, the network interface 220 uses the Narrowband Internet of Things (NB-IoT) which is a low-power wide-area network (LPWAN) technology that is part of the Third Generation Partnership Project (3GPP) standard.

In some implementations, the network interface 220 comprises a Wide Area Network (WAN) modem using non-cellular WAN technologies. The network interface 220 may use non-cellular WAN technologies. One example of a non-cellular WAN technology that the network interface 220 can use is the Worldwide Interoperability For Microwave Access (WiMAX™) which is based on the IEEE 802.16 family of standards. Another example of a non-cellular WAN technology that the network interface 220 may use is Long Range Wide Area Network (LoRaWAN™) technology which is a low-power WAN protocol. Yet another example of a non-cellular WAN technology that the network interface may use is Weightless which is a family of open standard low-power WAN (LPWAN) technology that operate in the sub-GHz frequency bands.

In some implementations, the network interface 220 uses a wired network technology when the asset tracker 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 is used to transmit the asset tracking data 112 to the asset tracking server 130 over the network 50. The network interface 220 may also be used to receive instructions from the asset tracking server 130 for configuring the asset tracker 200 in a certain mode and/or requesting a particular type of the asset tracking data 112 from the asset 100. The network interface may be integrated into the controller 230 or connected thereto via a parallel interface or a serial interface such as SPI, I2C, UART, USB, or SDIO.

The battery 210 is used to power the asset tracker 200. The battery 210 is a non-rechargeable battery that may be a zinc-carbon battery or an alkaline battery. For an asset tracker that is to be deployed in the field for years, the battery 210 is typically non-replaceable. This is particularly the case for asset trackers that have ingress protection and typically have a sealed housing.

In operation, the controller 230 may receive one or more of: sensor data from the other sensors 275, location data from the location module 280, and motion or orientation data from the IMU 290. Collectively, the gathered data comprises the asset tracking data 112. The controller 230 transmits the asset tracking data 112 to the asset tracking server 130 over the network 50 via the network interface 220.

In some implementations, the asset tracker 200 receives, via the network interface 220, commands from the asset tracking server 130 over the network 50. The received commands instruct the asset tracker 200 to be configured in a particular way. For example, the received commands may configure the way, rate, or frequency by which the asset tracker 200 gathers asset tracking data 112.

Modes of Operation

An asset tracker typically has at least two modes of operation. In motion detection mode, the asset tracker uses an IMU to determine whether the asset to which the asset tracker is coupled (and hence the asset tracker itself) has sustained motion for a particular duration. In response to determining that the asset tracker has experienced sustained motion for a particular duration, the asset tracker transitions to travel mode. During travel mode, the asset tracker enables (i.e., powers up) the location module 280 to track the location of the asset. In order to conserve battery power, the asset tracker does not leave the location module powered up at all times during travel mode. Instead, the asset tracker periodically powers up the location module to obtain discrete locations of the asset. During travel mode, the asset tracker also periodically powers up the network interface and sends asset tracking data to a remote server such as an asset tracking server. In some implementations, the period at which the asset tracker reports asset tracking data is large (e.g. 24 hours) in order to have a long battery life. Since the network interface 220 (e.g., a cellular modem) consumes more power than a location module (e.g., a GNSS transceiver) the asset tracker typically powers up the network interface and reports the location less frequently. When motion stops, the asset tracker transitions back to the motion detection mode.

One problem with operating an asset tracker in motion detection mode is that any sustained motion for a particular duration is presumed, by the asset tracker, to mean that the asset tracker is traveling and that the location thereof needs to be tracked. Accordingly, whenever sustained motion is detected for a particular duration or more, the location module and/or the network interface are powered up. There are situations, however, when sustained motion may take place before the asset tracker is deployed in the field. For example, the asset tracker 200 may be in transit while being shipped to a customer. If the asset tracker is in motion detection mode, the asset tracker 200 transitions to travel mode unnecessarily. Powering up the location module 280 and/or the network interface 220 consumes battery power. Since the battery is non-rechargeable and non-replaceable the life of the asset tracker 200 is reduced as a result of the false determination of travel and the unnecessary transition to travel mode.

One solution to the aforementioned problem is to have an additional mode, known as the shipping mode, which is an ultra-low power mode. While in shipping mode, most of the peripherals of the asset tracker 200 are powered off. The asset tracker only transitions to motion detection mode in response to activation trigger activity. This is illustrated in FIG. 4.

Figure 4:
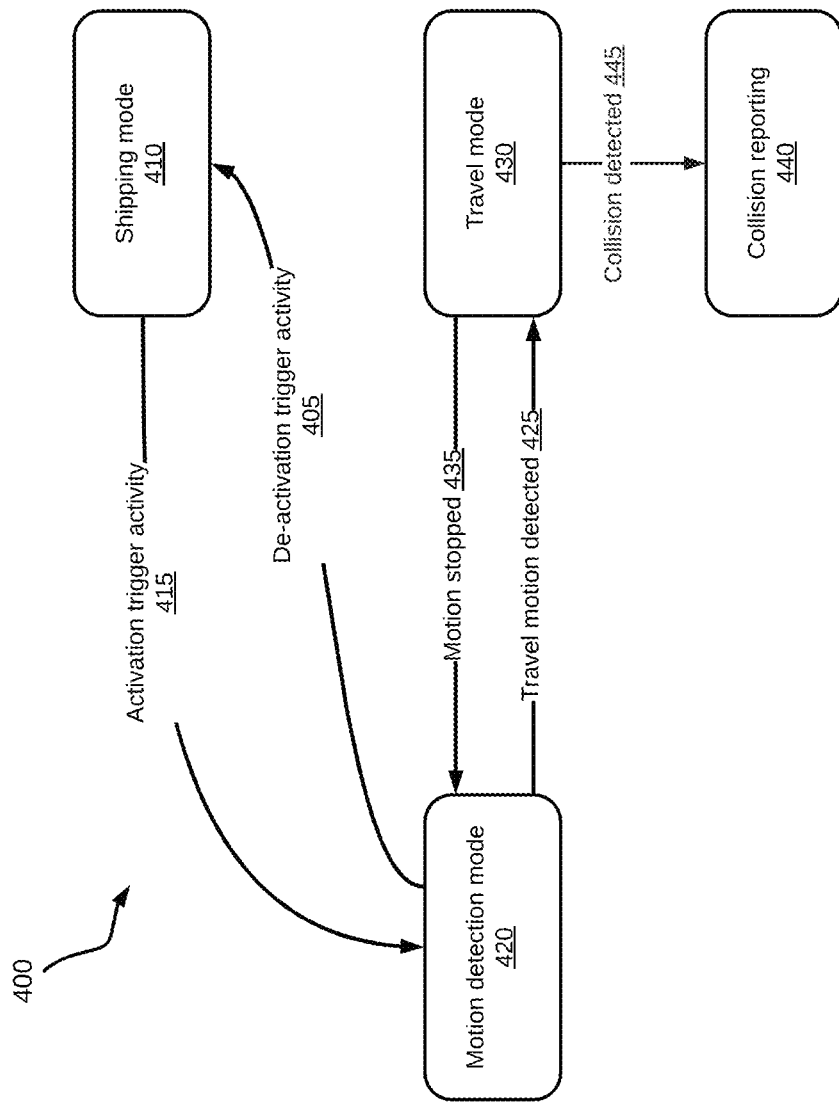
FIG. 4 is a state diagram showing the operating states of an exemplary battery-powered asset tracker, in accordance with embodiments of the present disclosure.

FIG. 4 is a state diagram 400 depicting the different modes of operations of an asset tracker 200, in accordance with embodiments of the present disclosure. When the asset tracker 200 is off production and ready to ship to a customer, the asset tracker 200 is in shipping mode 410. In shipping mode 410, the asset tracker 200 has most of the peripherals thereof powered down except for one or more peripherals necessary for detecting an activation trigger activity 415. Examples of peripherals necessary for detecting an activation trigger activity include the IMU 290 and the proximity sensor 250.

In some implementations, the activation trigger activity 415 involves tapping on the asset tracker 200 or performing a mid-air gesture with the asset tracker 200. In such implementations, in shipping mode 410 most of the peripherals are powered off and the IMU 290 is configured to detect tapping activity or orientation change activity. The controller 230 is configured to operate in a low-power (sleep) mode and only wake up when the IMU 290 detects a tapping or an orientation change.

In some implementations, the activation trigger activity 415 comprises losing proximity with a proximity object disposed in the packaging in which the asset tracker 200 is shipped. In this case, a proximity sensor 250 of the asset tracker 200 senses that proximity with a proximity object disposed in the packaging is lost and notifies the controller 230, such as by an interrupt signal. In response, the controller 230 executes machine-executable programming instructions that transitions the asset tracker 200 to motion detection mode 420. In such implementations, the IMU 290 is powered off during shipping mode 410 and is powered up when the asset tracker 200 enters motion detection mode 420.

Upon entering the motion detection mode 420, the asset tracker 200 performs some initial activation actions. For example, the asset tracker 200 powers up the network interface 220 and communicates with the asset tracking server 130 indicating that the asset tracker 200 is activated. In some implementations, in response to entering the motion detection mode 420, the asset tracker 200 additionally powers up the location module 280 and sends the current location thereof to the asset tracking server 130. Subsequent to that, the asset tracker 200 powers off the location module 280 as the asset tracker 200 is activated but stationary while in motion detection mode. In motion detection mode 420, most peripherals are turned off except for the IMU 290.

In motion detection mode 420, the asset tracker is configured to check for a travel motion event 425. Specifically, the IMU 290 is configured to check for sustained acceleration indicative of the asset tracker 200 being in motion. For example, the IMU 290 is configured to check for sustained acceleration exceeding a particular magnitude for a predetermined duration (e.g., 2 seconds). For example, a travel motion acceleration threshold ("travel motion threshold") of 0.1 g to 0.3 g may be used to detect travel motion. If the IMU 290 detects sustained acceleration exceeding the travel motion threshold for the predetermined duration, the IMU 290 wakes up the controller 230 (e.g., by an interrupt signal). In response to determining that the asset tracker 200 has experienced sustained acceleration for the predetermined duration, the controller 230 executes machine-executable programming instructions which configure the asset tracker 200 to operate in travel mode 430.

In motion detection mode 420, the asset tracker 200 configures the IMU 290 to sample the built-in accelerometers thereof at a low sampling rate, such as 1 Hz to 10 Hz. This is because in motion detection mode 420, the asset tracker 200 is checking for sustained acceleration indicative of travel. Additionally, in some implementations, the IMU 290 is configured for noise filtering to filter out high frequency acceleration that could be indicative of vibration. For example, the asset tracker 200 may be deployed in a concrete mixer, a generator, or any other equipment that undergoes a certain level of vibration during operation even as the equipment is not in motion. To filter the noise, acceleration data is passed through a low-pass filter integral to the IMU 290. Noise filtering serves to eliminate or at least reduce false positives that may be detected by the IMU 290 during operation.

In some implementations, in motion detection mode 420, the asset tracker 200 checks for a deactivation trigger activity 405. When the asset tracker 200 detects a deactivation trigger activity 405, the asset tracker 200 transitions back to shipping mode 410. In some implementations, the deactivation trigger activity 405 is similar to the activation trigger activity 415. For example, the deactivation trigger activity 405 may involve a sequence of single or double-tapping actions on the housing 202 of the asset tracker. In another example, the de-activation trigger is a plurality of mid-air gestures similar to the mid-air gestures used as the activation trigger activity 415. In other cases, when in motion detection mode, the IMU 290 is configured to detect different sequences of tapping or mid-air gestures. In some implementations, the restoration of proximity of the asset tracker 200 to a proximity object in the packaging comprises a de-activation trigger activity. Deactivating the asset tracker 200 can be used to prolong the file of the asset tracker 200 when it is not expected to be in use for an extended period of time.

In travel mode 430, the asset tracker powers up the location module 280 periodically to determine the location of the asset tracker 200, and hence the location of the asset 100. Also periodically, the asset tracker 200 powers up the network interface 220 to send the location to the asset tracking server 130. The frequency at which the asset tracker sends the location to the asset tracking server 130 may, in some implementations, be less than the frequency at which the asset tracker powers up the location module 280 to determine the location. For example, the asset tracker 200 may, in travel mode 430, check the location thereof on an hourly basis to determine whether the asset tracker is still in motion or not. If the asset tracker 200 is still in motion, the asset tracker 200 may power off the location module and check again in another hour. Every 3-4 hours, every 12 hours, or every 24 hours, the asset tracker 200 may power up the network interface 220 to report the location thereof. This is because the network interface 220 (e.g., a wireless modem) typically consumes significantly more power than a location module 280 (e.g., a GNSS transceiver).

In some implementations, while in travel mode 430 the IMU 290 is configured for detecting abrupt acceleration characteristic of collisions or freefalls. For example, the IMU 290 may be configured to detect acceleration values greater than a particular threshold, such as 1 g or 1.5 g, and wake up the controller 230 if the IMU 290 detects such acceleration values. When a collision detection 445 takes place, the asset tracker 200 transitions to a collision reporting mode 440. In collision reporting mode 440, the controller 230 executes machine-executable programming instructions which read collision-related acceleration values from the IMU 290, power up the network interface 220, and send a notification of the collision to asset tracking server 130 including the collision-related acceleration values. The asset tracker 200 then automatically transitions back to travel mode 430.

While in travel mode 430, when successive locations reported by the location module 280 to the controller 230 indicate that the asset tracker has not moved, that constitutes a motion stopped event 435. In response to a motion stopped event 435, the asset tracker 200 transitions back to the motion detection mode 420. In some implementations, detecting motion stopped event 435 comprises configuring the IMU 290 to generate an event (e.g., an interrupt to the controller 230) when motion is not detected for an extended period of time. In some implementations, in response to the event, the controller 230 activates (e.g., wakes up) the location module (e.g., a GPS module) to validate that the motion has stopped.

Tapping as an Activation Trigger Activity

Figure 5:
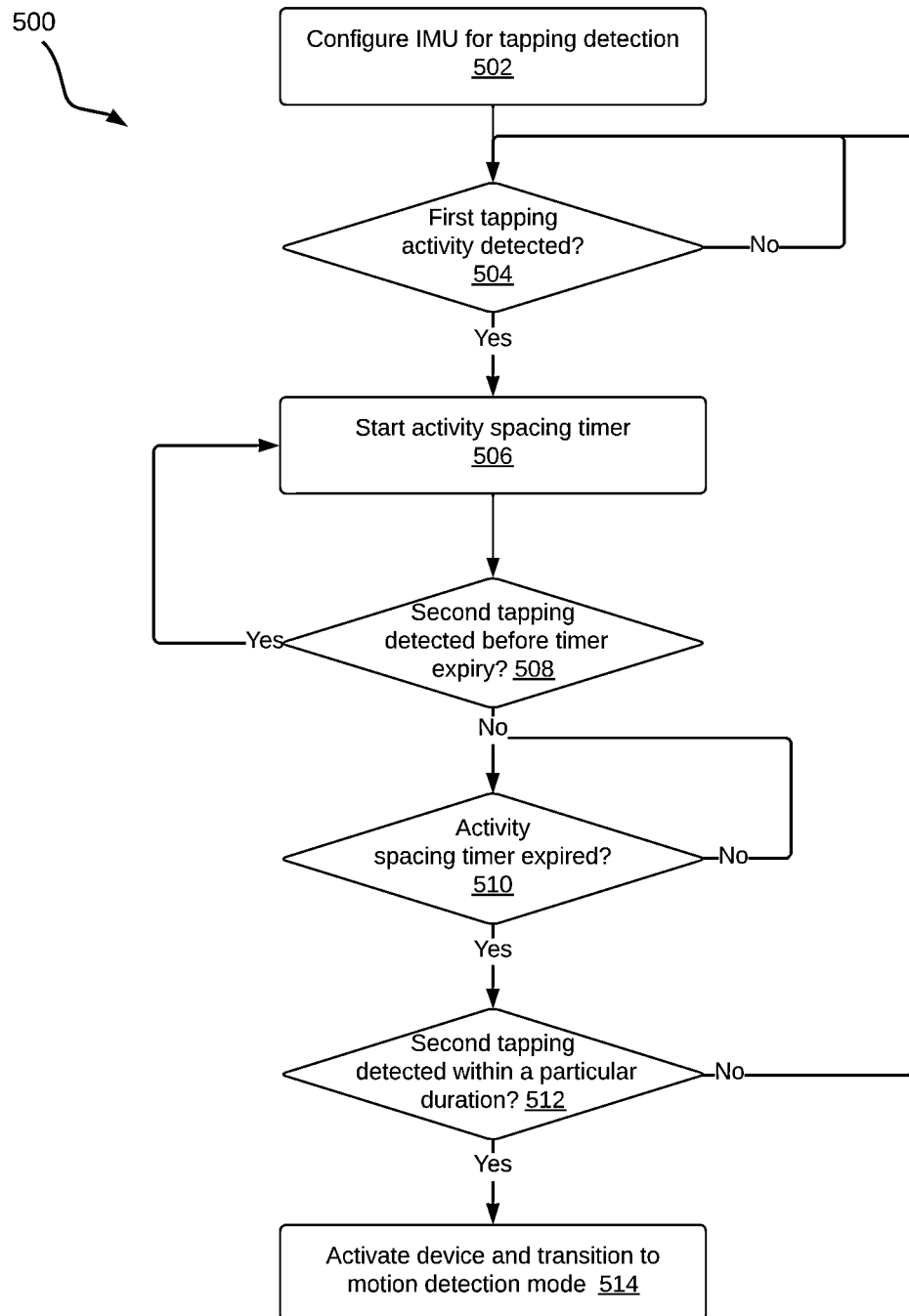
FIG. 5 is a flowchart depicting a method of activating a battery-powered asset tracker using tapping activity, in accordance with embodiments of the present disclosure.

In some implementations, the activation trigger activity 415 is in the form of a tapping sequence on the housing 202 of the asset tracker 200. FIG. 5 depicts a method 500 of detecting an activation trigger activity 415 that is comprised of a first tapping activity followed by a second tapping activity spaced in time from the first tapping activity, in accordance with implementations of the present disclosure.

The method 500 begins at step 502. At step 502, the IMU 290 is configured for tapping detection. For example, the IMU 290 may be configured to check for a single-tap or a double tap on the top housing surface 203 of the housing 202. Specifically, the IMU 290 may be configured to detect and report acceleration events consistent with tapping in the Z-axis, assuming the Z-axis is the vertical direction perpendicular to the asset tracker 200 when the asset tracker 200 is placed horizontally as shown in FIG. 2. Many IMUs designed for use with smartphones include special features by which a single-tap or a double-tap exceeding a tapping threshold can be detected. The tapping threshold is an acceleration value usually specified as a fraction of the gravity acceleration (g). For example, a tap may be detected when the IMU senses an acceleration value that is greater than 0.5 g or 1 g. When a tap is detected, the IMU 290 generates an interrupt signal that can be used by a controller, such as the controller 230, to determine that a tap has taken place.

At step 504, the asset tracker 200 checks whether a first tapping activity has taken place. For example, when a tapping activity has taken place, the controller 230 receives an interrupt signal from the IMU 290 indicating an event detection by the IMU 290. The controller 230 then queries the IMU 290 to verify the cause of the interrupt. For example, the IMU 290 may contain a status register that indicates the cause of the interrupt that the IMU 290 has generated. The controller 230 may execute machine-executable programming instructions which read the status register from the IMU 290 and verify that the cause of the interrupt was a tapping event. When a first tapping activity is detected, control goes to step 506. Otherwise, control stays in step 504.

In some embodiments, the activation trigger activity is comprised of a first tapping activity followed by a second tapping activity spaced in time by an activity spacing duration from the first tapping activity. For example, the activation trigger may be comprised of two double-taps spaced by at least 3 seconds. If a second tapping activity is detected before the activity spacing duration has expired, the asset tracker 200 ignores the second activity to prevent false positives. As such, when the first tapping activity is detected, the asset tracker 200 starts an activity spacing timer at step 506.

At step 508, if a second tapping activity is detected before the expiry of the activity spacing timer, the second tapping activity replaces the first tapping activity and control goes back to step 506 where the activity spacing timer is restarted. Otherwise, control goes to step 510.

At step 510, if the activity spacing timer has not yet expired, control stays at step 510. When the activity spacing timer has expired, control goes to step 512.

At step 512, the asset tracker 200 checks whether a second tapping activity is detected within a particular duration of the first tapping activity. For example, the asset tracker 200 may be looking for a first tapping activity followed by a second tapping activity by between 3 and 5 seconds. As such the activity spacing timer may be restarted after expiry with a timeout duration of 2 seconds. When the second tapping activity has been detected after the activity spacing timer has expired but within a particular duration of the first tapping activity, control goes to step 514. Otherwise, the method goes back to step 504.

At step 514 the asset tracker 200 conducts activation actions and transitions to the motion detection mode.

The first tapping activity and the second tapping activity may each be a single-tap or a double-tap.

Mid-Air Gestures as an Activation Trigger Activity

In some implementations, the activation trigger activity 415 is in the form of mid-air gestures. Mid-air gestures may be in the form of linear movements or orientation changes. To avoid false positives, the asset tracker 200 transitions from a shipping mode 410 to a motion detection mode 420 when both a first mid-air gesture and a second mid-air gesture are detected.

In some implementations, the first mid-air gesture and the second mid-air gesture each comprises one or more orientation changes. The IMU 290 can be configured to detect an orientation change event around any one of the X-axis, the Y-axis, or the Z-axis. The orientation change comprises a rotation by an angle in either the clockwise direction or the counterclockwise direction. In this disclosure, a clockwise orientation change is termed a positive orientation change, whereas a counterclockwise orientation change is termed a negative orientation change. FIGS. 6A-6C, 7A-7C, and 8A-8C depict the asset tracker 200 experiencing different mid-air gestures each comprised of two orientation changes.

Figure 6A:
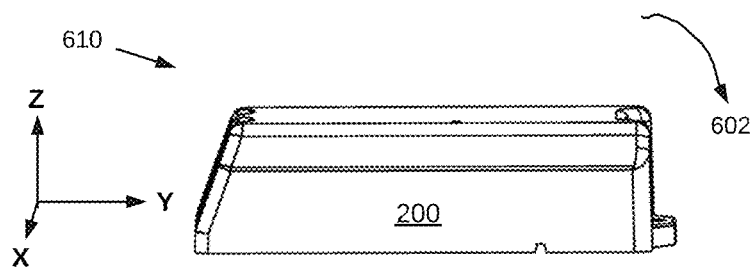
FIGS. 6A-6C depict an asset tracker undergoing a first mid-air gesture wherein the asset tracker is rotated clockwise by 90 degrees along an X-axis thereof, then rotated back to its original orientation, in accordance with embodiments of the present disclosure.
Figure 6B:
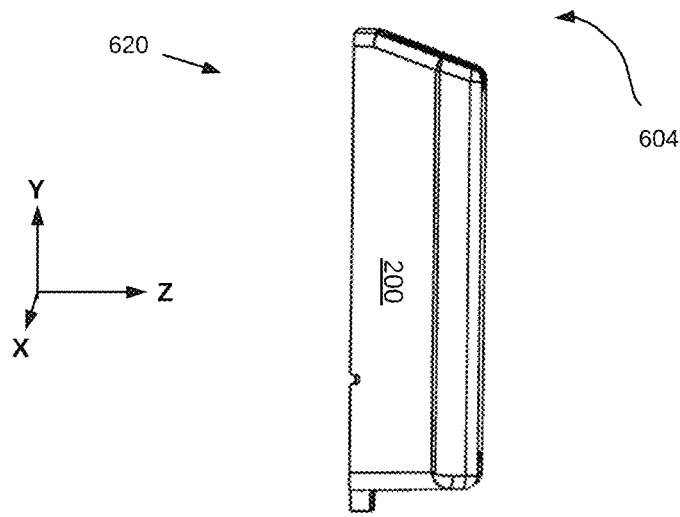
Figure 6C:
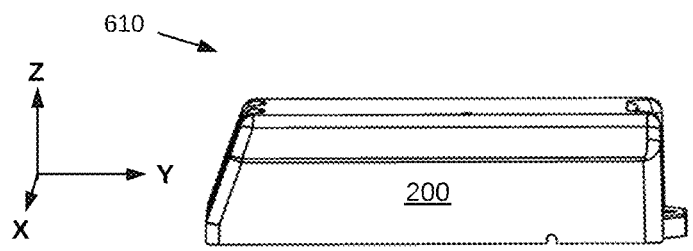

FIG. 6A depicts the asset tracker in a horizontal orientation 610 relative to the X, Y, and Z axis. The asset tracker is rotated in the clockwise direction 602 around the X-axis. FIG. 6B depicts the asset tracker 200 in a second orientation 620 after it has been rotated in the clockwise direction 602 by 90 degrees. The asset tracker 200 is rotated in the counterclockwise direction 604 by 90 degrees back to the horizontal orientation 610 as shown in FIG. 6C. The sequence of orientation changes depicted in FIGS. 6A-6C can be used as a first mid-air gesture or a second mid-air gesture.

Figure 7A:
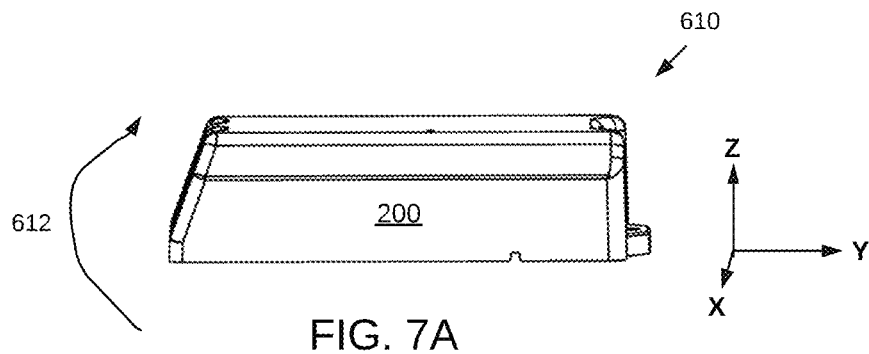
FIGS. 7A-7C depict an asset tracker undergoing a second mid-air gesture wherein the asset tracker is rotated clockwise by 90 degrees along a Y-axis thereof, then rotated back to its original orientation, in accordance with embodiments of the present disclosure.
Figure 7B:
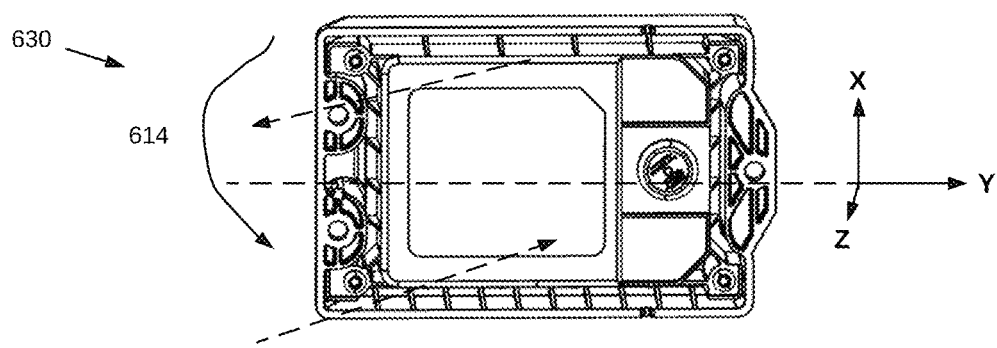
Figure 7C:
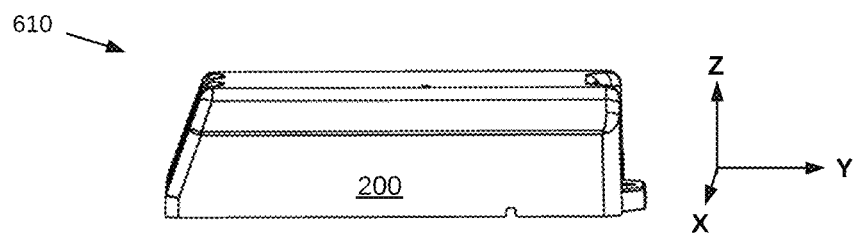

FIG. 7A depicts the asset tracker in a horizontal orientation 610 relative to the X, Y, and Z axis. The asset tracker is rotated in the counterclockwise direction 612 around the Y-axis. FIG. 7B depicts the asset tracker 200 in a second orientation 630 after it has been rotated in the counterclockwise direction 612 by 90 degrees. The asset tracker 200 is then rotated in the clockwise direction 614 by 90 degrees back to the horizontal orientation 610 as shown in FIG. 7C. The sequence of orientation changes depicted in FIGS. 7A-7C can be used as a first mid-air gesture or a second mid-air gesture.

Figure 8A:
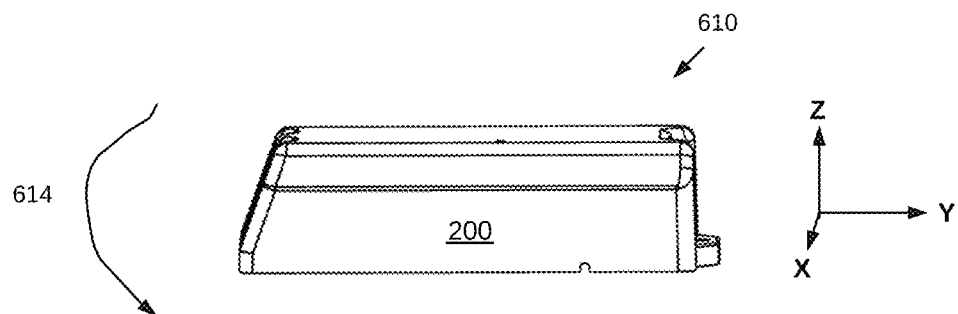
FIGS. 8A-8C depict an asset tracker undergoing a third mid-air gesture wherein the asset tracker is rotated counter-clockwise by 90 degrees along a Y-axis thereof, then rotated back to its original orientation, in accordance with embodiments of the present disclosure
Figure 8B:
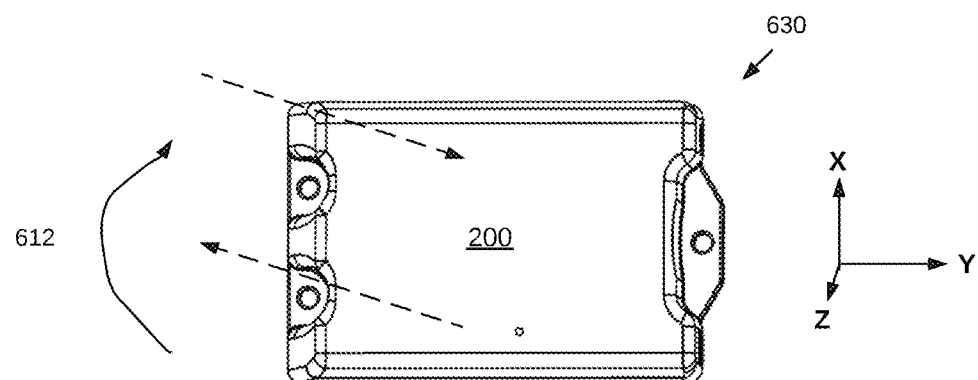
Figure 8C:
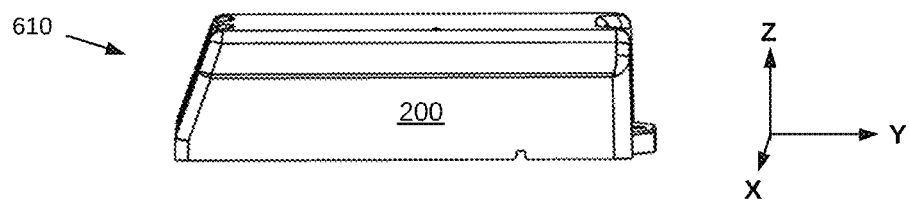

FIG. 8A depicts the asset tracker in a horizontal orientation 610 relative to the X, Y, and Z axis. The asset tracker is rotated in the clockwise direction 614 around the Y-axis. FIG. 8B depicts the asset tracker 200 in a second orientation 630 after it has been rotated in the counterclockwise direction 612 by 90 degrees. The asset tracker 200 is rotated in the clockwise direction 614 by 90 degrees back to the horizontal orientation 610 as shown in FIG. 8C. The sequence of orientation changes depicted in FIGS. 8A-8C can be used as a first mid-air gesture or a second mid-air gesture.

Figure 9:
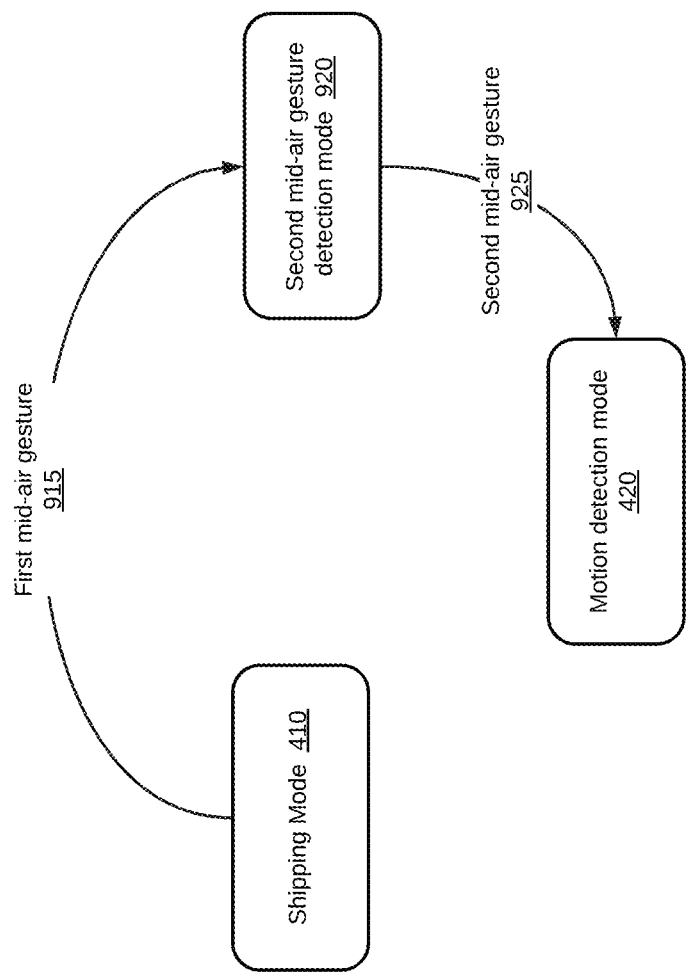
FIG. 9 is a state diagram depicting how an exemplary asset tracker transitions from a shipping mode to a motion detection mode in response to a first mid-air gesture and a second mid-air gesture, in accordance with embodiments of the present disclosure.

FIG. 9 depicts a state diagram showing the transitioning of the asset tracker 200 from the shipping mode 410 to the motion detection mode 420 in response to an activation trigger comprising two mid-air gestures, in accordance with implementations of the present disclosure. While in the shipping mode 410, the asset tracker 200 is configured for detecting a first mid-air gesture. When the asset tracker 200 detects a first mid-air gesture 915, the asset tracker transitions to an intermediate second mid-air gesture detection mode 920 in which the asset tracker 200 is configured for detecting a second mid-air gesture. When the second mid-air gesture 925 is detected, the asset tracker 200 transitions to motion detection mode 420.

Figure 10:
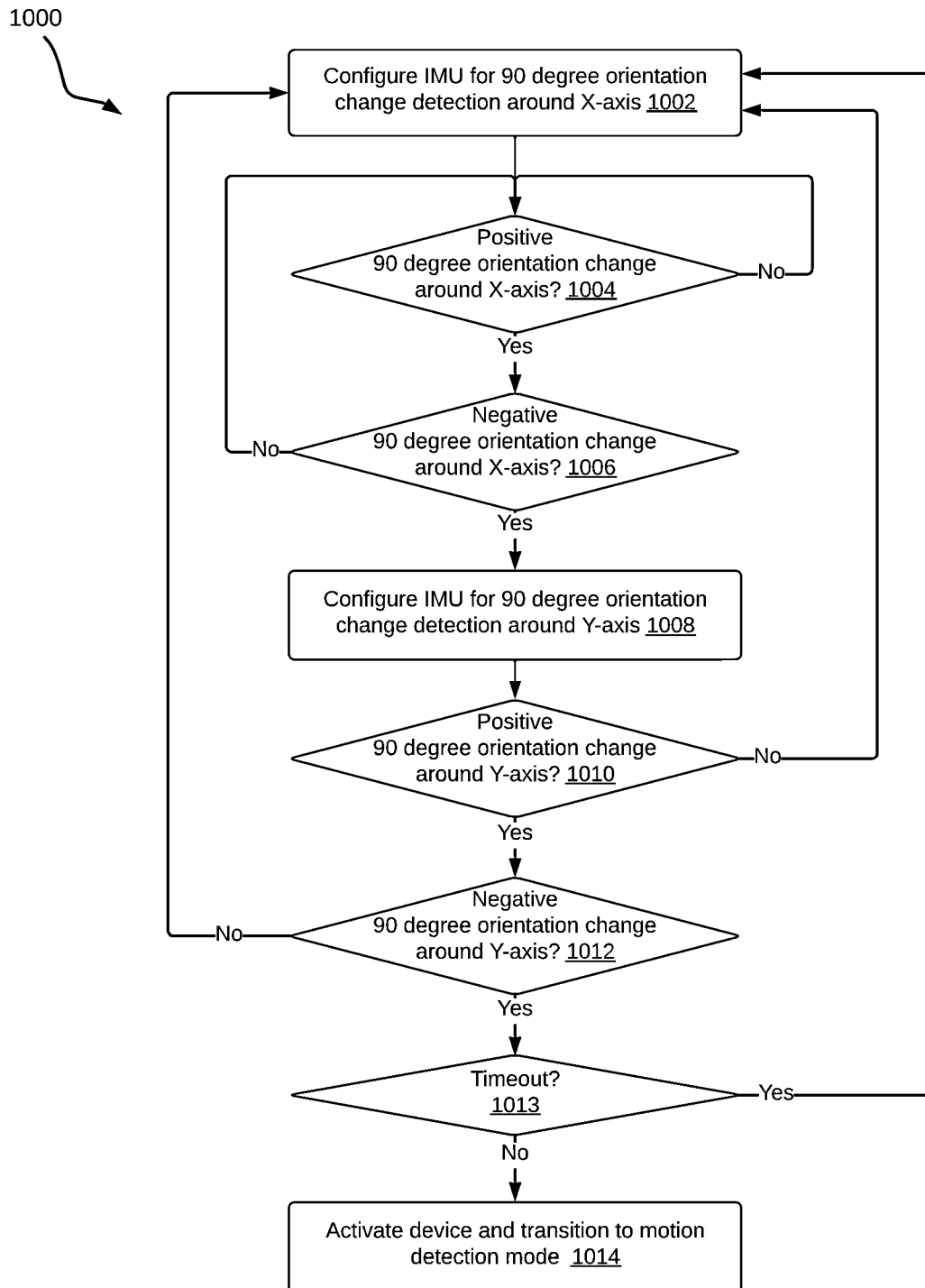
FIG. 10 is a flowchart depicting a method of activating an asset tracker in response to the mid-air gestures of FIGS. 6A-6C followed by either the mid-air gestures of FIGS. 7A-7C or the mid-air gestures of FIGS. 8A-8C, in accordance with embodiments of the present disclosure.

FIG. 10 depicts a method 1000 by which the asset tracker 200 transitions from shipping mode 410 to motion detection mode in response to detecting the mid-air gesture of FIGS. 6A-6C followed by the mid-air gesture of FIGS. 8A-8C, in accordance with implementations of the present disclosure. In this method, the mid-air gesture is comprised of a sequence of orientation changes. The orientation changes must be detected in sequence and must be completed within a predetermined timeout duration, which may be termed the "mid-air gesture timeout". If the sequence is broken, the mid-air gesture resets and the user must start over. Additionally, if the mid-air gesture is not completed within the predetermined timeout duration ("mid-air gesture timeout"), the mid-air gesture resets and the user must start over. By way of example only, the mid-air gesture timeout may be 5 seconds.

At step 1002, the asset tracker 200 configures the IMU 290 for detecting a 90 degree orientation change around the X-axis thereof. For example, the IMU 290 may contain a register in which an angle of orientation change threshold is programmed. The asset tracker 200 may configure the IMU 290 to detect an orientation change greater than 70 degrees or greater than 80 degrees. The IMU 290 may also have a register in which the axis of detection is specified. As such, the asset tracker 200 can specify the axis of detection to be the X-axis for detecting the mid-air gestures of FIGS. 6A-6C.

At step 1004, when the asset tracker 200 detects a positive 90 degree orientation change around the X-axis, control goes to step 1006. Otherwise, control remains at step 1004.

At step 1006, when the asset tracker 200 detects a negative 90 degree orientation change around the X-axis, control goes to step 1008. If the asset tracker 200 detects another orientation change, the mid-air gesture resets, and control goes back to step 1004.

By step 1008, the asset tracker 200 has recognized a first mid-air gesture comprised of a positive 90 degree orientation change around the X-axis (i.e., from FIG. 6A to FIG. 6B) and a negative 90 degree orientation change around the X-axis (i.e., from FIG. 6B to FIG. 6C). In order to reduce the possibility of false positives and to ensure that activating the asset tracker 200 was intended, the asset tracker 200 configures the IMU 290 for detecting a second mid-air gesture comprised of 90 degree orientation changes around a different axis, such as the Y-axis.

At step 1010, when the asset tracker 200 detects a positive 90 degree orientation change around the Y-axis, control goes to step 1012. If another orientation change is detected, the mid-air gesture resets, and control goes back to step 1002 to re-configure the IMU for a 90 degree orientation change detection around the X-axis.

At step 1012, when the asset tracker 200 detects a negative 90 degree orientation change around the Y-axis, control goes to step 1013. If another orientation change is detected, the mid-air gesture resets, and control goes back to step 1002 to re-configure the IMU for a 90 degree orientation change around the X-axis.

At step 1013, the asset tracker 200 checks whether a mid-air gesture timeout has elapsed. As mentioned above, the mid-air gesture must be completed within a particular duration, or it is deemed not to have been detected. In some implementations, the asset tracker 200 configures a timer with the mid-air gesture timeout duration. At step 1013, the asset tracker 200 checks whether the timer has timed out. If the timer has already timed out, then the mid-air gesture is deemed not detected and control goes back to step 1002. In some implementations, the step 1013 is an interrupt-based event. In other words, the asset tracker 200 configures a timer with a timeout duration equal to the mid-air gesture timeout duration. Any time the timer expires, an interrupt signal is generated and an interrupt handler runs. The interrupt handler checks whether the mid-air gesture has been completely detected. If not, the interrupt handler resets the mid-air gesture and causes step 1002 to run.

In steps 1010 and 1012, the asset tracker 200 has detected a second mid-air gesture comprised of a positive 90 degree orientation change around the Y-axis (i.e., FIG. 8A to FIG. 8B) followed by a negative 90 degree orientation change around the Y-axis (.e., FIG. 8B to FIG. 8C). At step 1014, the asset tracker 200 is activated and transitions to the motion detection mode 420.

Figure 11:
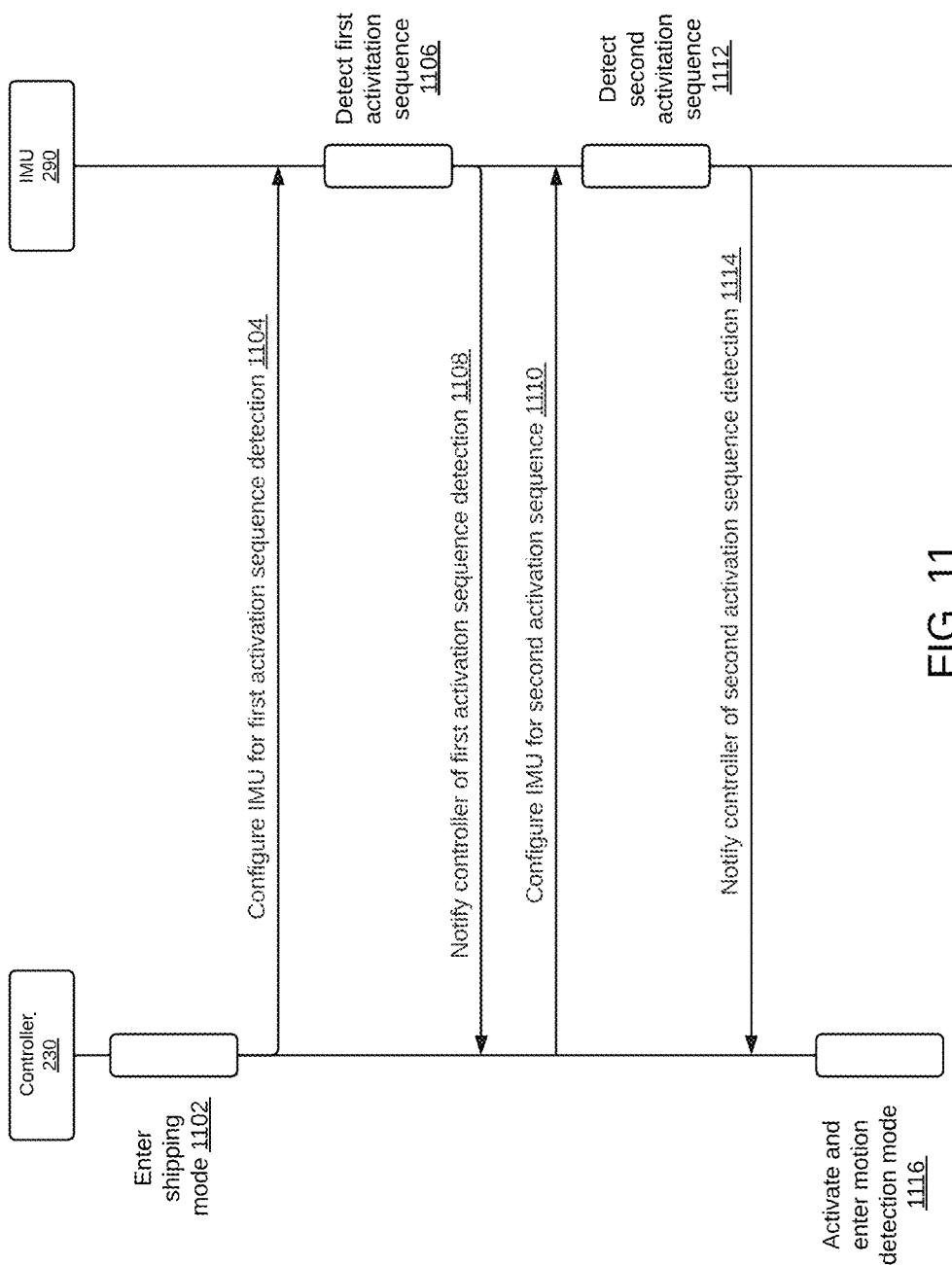
FIG. 11 is a message sequence diagram showing the interactions between the controller of the asset tracker and the inertial measurement unit (IMU) thereof during the detection of activation sequences, in accordance with embodiments of the present disclosure.

As discussed above, the controller 230 executes machine-executable computer programming instructions (i.e., firmware) that configures the IMU 290 for detecting the various activation sequences. FIG. 11 is a sequence diagram illustrating a simplified exemplary interaction between the controller 230 and the IMU 290 as the asset tracker 200 transitions from the shipping mode 410 to the motion detection mode 420 in response to an activation trigger activity comprised of a first activation sequence and a second activation sequence.

At step 1102, the asset tracker 200 enters shipping mode 410. The asset tracker 200 enters shipping mode as soon as the asset tracker 200 is manufactured, the battery 210 is disposed therein, and the housing 202 is closed.

At step 1104, the controller 230 configures the IMU 290 for detection of the first activation sequence. The first activation sequence may be a double tapping activity or one of the orientation change mid-air gestures of FIGS. 6A-6C, 7A-7C, or 8A-8C.

At step 1106, the IMU 290 detects a first activation sequence. If the first activation sequence comprised a single tap or a double tap, the IMU 290 detects the activity in a single step. If the first activation sequence was a mid-air gesture comprised of a first orientation change and a second orientation change, then the IMU 290 detects each orientation change in a separate step.

At step 1108, the IMU 290 sends a notification to the controller 230 indicating that the first activation sequence has been detected. The notification may be in the form of an interrupt that wakes up the controller 230 and places the cause of the interrupt in a status register of the IMU 290. The controller 230 may then access the status register to ascertain the cause of the interrupt, which is the detection of the orientation change. For a first mid-air gesture comprised of a first orientation change and a second orientation change, the notification of step 1108 is sent twice, once for each orientation change detection.

At step 1110, the controller sends a configuration message to the IMU 290 to configure the IMU 290 for detecting the second activation sequence. For example, the first activation sequence may be a double-tap while the second activation sequence may be a single tap. In this case, the IMU 290 needs to be configured to detect a single tap instead of a double-tap. As another example, the first activation sequence may be a first mid-air gesture comprising orientation changes around the X-axis while the second activation sequence may be a mid-air gesture comprising orientation changes around the Y-axis. Hence the controller 230 sends a message to configure the IMU 290 to detect orientation changes around the Y-axis for the second activation sequence.

At step 1112, the IMU 290 detects the second activation sequence. If the second activation sequence is a tapping action, then the detection of the second activation sequence takes place in one step. If the second activation sequence is a mid-air gesture comprising two orientation changes, then detecting the second activation sequence comprises detecting a first orientation change and a second orientation change.

At step 1114, the IMU 290 sends a notification of the second activation sequence detection to the controller 230. If the second activation sequence is a second mid-air gesture comprising two orientation changes, then the notification of the second activation sequence comprises a notification of the first orientation change and the second orientation change of the second mid-air gesture.

At step 1116, in response to receiving both the notification of the first activation sequence detection and the second activation sequence detection, the controller 230 executes machine-executable programming instructions which configure the asset tracker 200 to operate in motion detection mode.

Proximity Sensor

Figure 12:
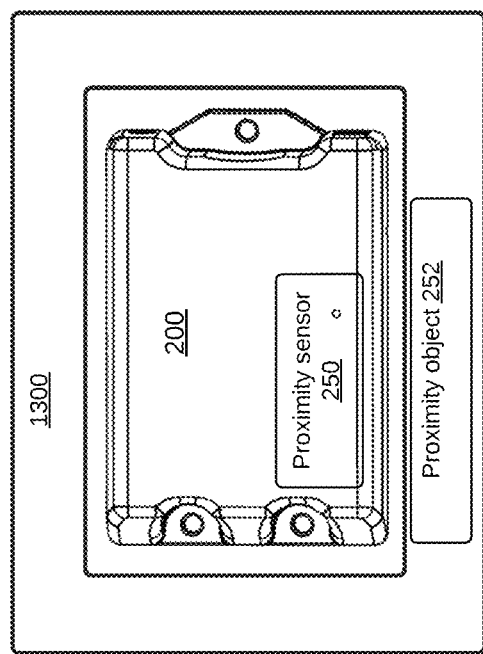
FIG. 12 is a top plan view of an exemplary asset tracker in a shipping box, the asset tracker having a proximity sensor and the shipping box having a proximity object, in accordance with embodiments of the present disclosure.

In some implementations, an asset tracker is activated when removed from a packaging such as a shipping box for more than a particular duration. Reference is made to FIG. 12. In FIG. 12, the asset tracker 200 has a proximity sensor 250. The asset tracker 200 is placed in a packaging such as the shipping box 1300. The shipping box 1300 has a proximity object 252. Initially, when the asset tracker 200 is placed in the shipping box, the proximity sensor 250 is in proximity to the proximity object 252. The proximity sensor 250 reports the proximity to the proximity object 252 to the controller 230. In response to determining the proximity of the asset tracker 200 to the proximity object 252, the asset tracker 200 enters shipping mode in which the controller is in lower-power (sleep) mode and the peripherals are powered off. When the asset tracker 200 is removed from the shipping box 1300, the proximity sensor 250 generates a notification event, such as an interrupt, to the controller 230 indicating the loss of proximity. If the loss of proximity lasts more than a particular proximity loss threshold duration, the asset tracker enters motion detection mode.

Figure 13:
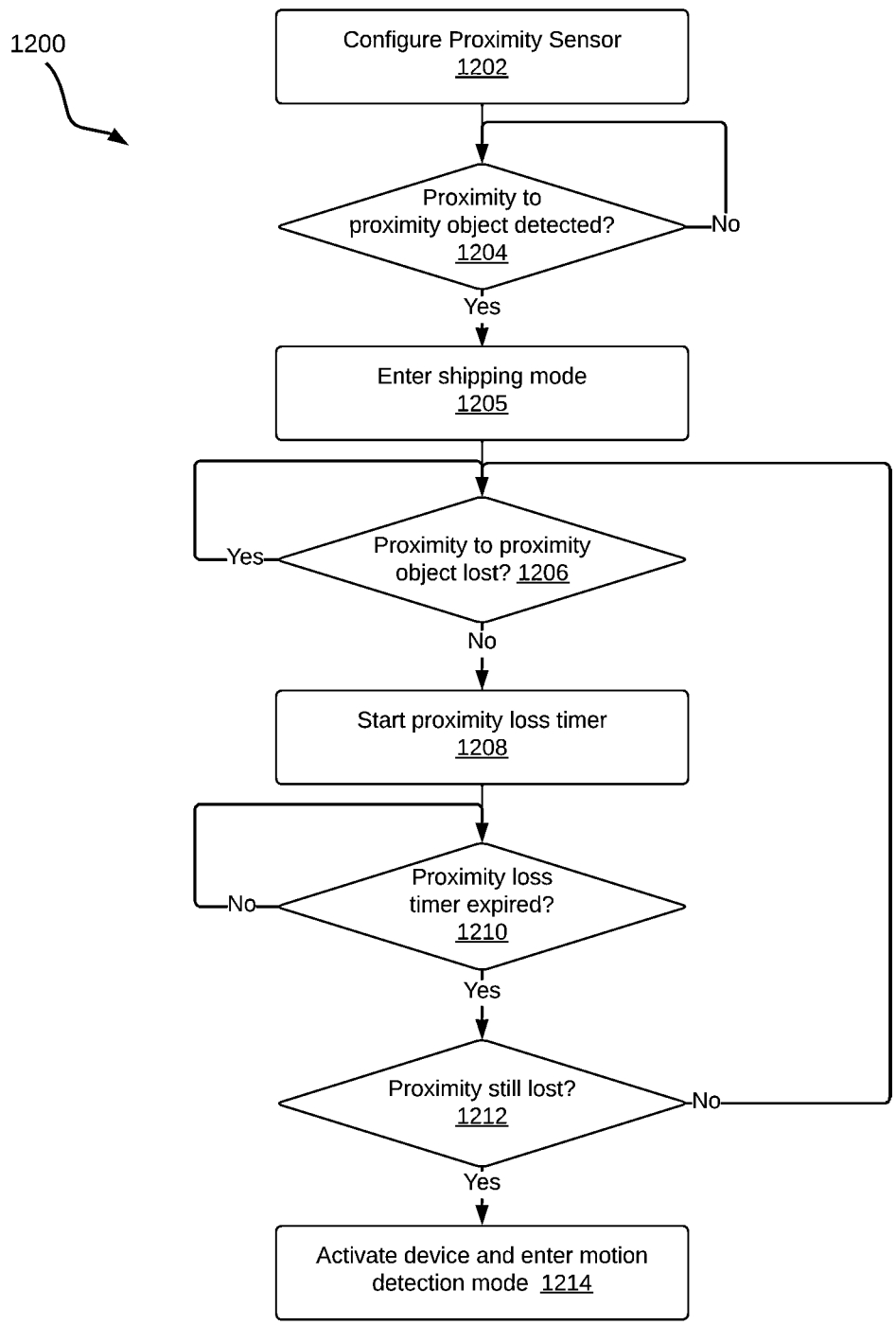
FIG. 13 is a flowchart depicting a method of activating an asset tracker utilizing a proximity sensor, in accordance with embodiments of the present disclosure.

FIG. 13 depicts a method 1200, by an asset tracker 200, for activating the asset tracker and entering motion detection mode based on loss of proximity, in accordance with implementations of the present disclosure.

At step 1202 the asset tracker configures the proximity sensor 250. For example, the proximity sensor 250 may be a Hall Effect sensor module that can be configured to generate an interrupt when there is proximity to a magnet and when proximity to a magnet is lost. A Hall Effect sensor is a type of sensor that can detect the presence and strength of a magnetic field using the Hall effect. Alternatively, the proximity sensor 250 may be a reed switch. A reed switch is an electrical switch that is operated by the presence or absence of a magnetic field. A reed switch consists of two thin, ferromagnetic (magnetically sensitive) metal reed contacts enclosed within a glass or plastic envelope. These reed contacts are positioned very close to each other but do not make physical contact under normal conditions. When there proximity sensor is close to the magnet, the magnetic field produced by the magnet causes the metal reed contacts to become magnetized. This attraction causes the reeds to come into contact, closing the switch. In this "closed" state, the reed switch conducts electrical current, allowing current to flow through the switch. Conversely, when the asset tracker is removed from the packaging, the magnet is no longer in proximity to the reed switch. As a result, there is no external magnetic field near the reed switch, and the two metal reed contacts remain separated. In this mode, the reed switch is in the normally open state in which the switch does not conduct electrical current.

At step 1204, the asset tracker checks whether the asset tracker has been placed in the shipping box by checking whether proximity to the proximity object has been detected. For example, the asset tracker may wait for an interrupt indicating that the Hall Effect sensor module has detected proximity with a magnet. If yes, that indicates that the asset tracker has been placed in the shipping box and control goes to step 1205. Otherwise, control stays at step 1204 waiting for the asset tracker to be placed in the packaging (e.g., shipping box). As another example, when the asset tracker is placed in the packaging, the magnet is in close proximity to the reed switch causing current to flow therethrough. Such current flow can trigger an interrupt and the asset tracker knows it has been placed in the shipping box and control goes to step 1205.

At step 1205, the asset tracker enters shipping mode. In shipping mode, the controller runs in low-power mode, and all other peripherals are powered down.

At step 1206, the controller waits for an event from the proximity sensor (e.g., Hall Effect sensor or reed switch) indicating a loss of proximity. If proximity is lost, control goes to step 1208. Otherwise, the asset tracker remains in step 1206.

In some instances, the asset tracker 200 is removed from the shipping box temporarily. For example, the asset tracker 200 may be removed from the box to copy a serial number or a model number written on a label thereon. In such cases, it is not desirable to exit shipping mode. As such, the asset tracker 200 is configured to delay exiting shipping mode and enabling motion detection mode until sufficient time has passed indicating that the asset tracker has been deployed in the field. For this purpose, at step 1208, the asset tracker 200 starts a proximity loss timer. The proximity loss timer is configured to expire after a proximity loss threshold duration that is considered sufficient to ensure that the removal of the asset tracker 200 from the packaging is caused by deployment in the field and not a temporary removal for inspection or copying data.

At step 1210, if the proximity loss timer has not yet expired, then control stays at 1210. The asset tracker remains in shipping mode. If the proximity loss timer has expired, control goes to step 1212.

At step 1212, the asset tracker 200 checks whether proximity with the proximity object is still lost. If proximity with the proximity object has been restored, control goes back to step 1206. If proximity with the proximity object is still lost, then control goes to step 1214.

At step 1214, the asset tracker is activated and motion detection mode is enabled.

Figure 14:
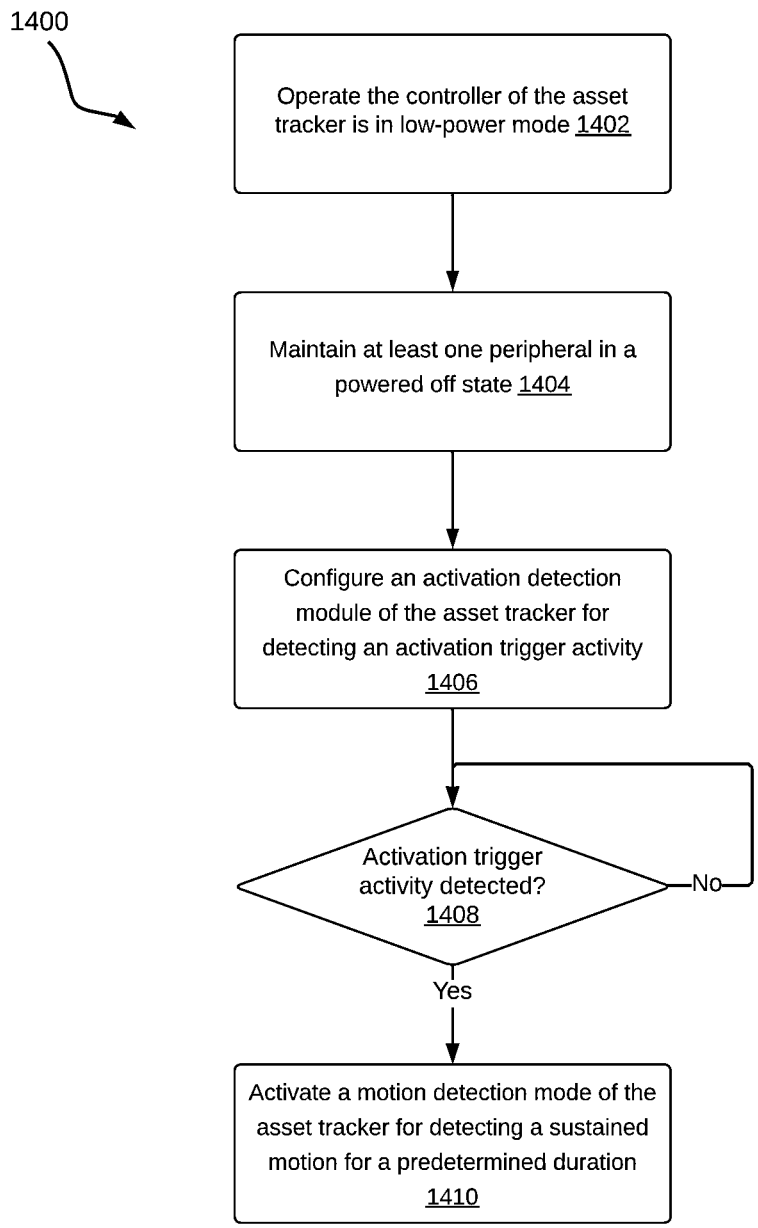
FIG. 14 is a flowchart depicting a general method for activating an asset in response to an activation trigger activity, in accordance with embodiments of the present disclosure.

FIG. 14 depicts a method 1400 by an asset tracker 200, in accordance with embodiments of the present disclosure.

At step 1402, the asset tracker operates the controller 230 of the asset tracker in low-power mode. In this mode the controller 230 is running at a very slow clock and can wake up on receiving an interrupt signal.

At step 1404, the asset tracker maintains a location module thereof in a powered off state.

At step 1406, the asset tracker configures an activation detection module for detecting an activation trigger activity.

At step 1408, the asset tracker checks whether an activation trigger activity has been detected, for example by the activation detection module.

In response to determining that an activation trigger activity has been detected, at step 1410 the asset tracker activates a motion detection mode for detecting a sustained motion for a predetermined duration.

In some implementations, activating the motion detection mode comprises configuring an inertial measurement unit (IMU) in the form of the IMU 290 thereof for detecting a sustained motion for a predetermined duration.

In some implementations, the IMU 290 comprises a 3-axis accelerometer and configuring the IMU 290 for detecting the sustained motion comprises configuring the 3-axis accelerometer to notify the controller 230 when the 3-axis accelerometer detects an acceleration value above an acceleration threshold for the predetermined duration.

In some implementations, the acceleration value is detected by an X-axis accelerometer, a Y-axis accelerometer, or both an X-axis accelerometer and a Y-axis accelerometer. This assumes that the horizontal plane of the asset tracker 200 is in the X-Y plane and the IMU 290 is installed in the asset tracker in the same orientation and measures X-axis and Y-axis acceleration values in the horizontal plane.

In some implementations, the activation detection module comprises the IMU 290. Configuring the activation detection module for detection the activation trigger activity comprises configuring the IMU 290 for detecting at least one tapping activity in a direction of an axis substantially perpendicular to a surface of the housing 202 of the asset tracker. For example, with reference to FIG. 2, the asset tracker is shown in a horizontal orientation with the horizontal plane thereof lying in the X-Y plane. A tapping activity on the top housing surface 203 of the housing 202 can be detected by an IMU 290 installed within the housing 202 of the asset tracker 200. When the IMU 290 is installed such that the horizontal plane thereof matches the horizontal plane of the asset tracker, a tapping activity on the top housing surface 203 of the housing 202 generates a tapping event in the Z-direction.

In some implementations, the at least one tapping activity comprises a first tapping activity and a second tapping activity spaced in time from the first tapping activity. In order to prevent accidental activation of the asset tracker, a single tapping activity is insufficient to trigger entering motion detection mode (i.e., configuring the IMU 290 for detecting a sustained motion for a predetermined duration). Hence a first tapping activity followed by a second tapping activity spaced in time from the first tapping activity are necessary to trigger activation. An exemplary method of activation of an asset tracker using a first tapping activity and a second tapping activity spaced in time from the first tapping activity is described in detail in FIG. 5 above.

In some implementations, the first tapping activity and the second tapping activity each comprises a double tap on the surface of the housing 202. Hence the activation trigger activity is comprised of a first double tap, a wait for a few seconds and a second double tap.

In some implementations, the activation detection module comprises the IMU 290 and detecting the activation trigger activity comprises detecting at least one mid-air gesture. A mid-air gesture involves holding the asset tracker 200 in the air then moving it in certain patterns including linear motion in any of the X, Y, or Z directions, and including rotations around any of the X, Y, or Z axis. Exemplary mid-air gestures involving rotations around the X-axis and the Y-axis are described above with reference to FIGS. 6A-6C, 7A-7C, and 8A-8C.

In some implementations, the at least one mid-air gesture comprises a first mid-air gesture and a second mid-air gesture different from the first mid-air gesture. For example, the first mid-air gesture may comprise any one of the gestures of FIGS. 6A-6C, 7A-7C, and 8A-8C. Similarly, the second mid-air gesture may comprise any one of the gestures of FIGS. 6A-6C, 7A-7C, and 8A-8C. In order to reduce false positives, the second mid-air gesture is preferably different from the first mid-air gesture. For example, if the first mid-air gesture corresponds to FIGS. 6A-6C, then the second mid-air gesture corresponds to either FIGS. 7A-7C or 8A-8C. Configuring the activation detection module for detecting the activation trigger activity comprises configuring the IMU 290 for detecting the first mid-air gesture. In response to detecting the first mid-air gesture, the asset tracker configures the IMU 290 for detecting the second mid-air gesture. This is explained in detail with reference to the message sequence diagram of FIG. 11.

In some implementations, configuring the IMU 290 for detecting the first mid-air gesture comprises configuring the IMU 290 for detecting at least one orientation change along a first axis for the asset tracker. Similarly, configuring the inertial measurement unit for detecting the second mid-air gesture comprises configuring the IMU 290 for detecting at least one orientation change along a second axis of the asset tracker 200.

In some implementations, the at least one orientation change comprises a first rotation, from an initial orientation, by a first angle exceeding a particular threshold angle around the respective axis and a second rotation by a second angle exceeding the particular angle threshold back to the original orientation. For example, with reference to FIGS. 6A-6C, 7A-7C, and 8A-8C, the initial orientation is depicted in any one of FIGS. 6A, 7A, and 8A. For FIGS. 6A-6C, the first rotation is from the initial orientation depicted in FIG. 6A to the orientation depicted in FIG. 6B. The first rotation is by an angle of 90 degrees. To detect such an orientation change of a 90 degree rotation, the IMU 290 is configured to report an orientation change exceeding a particular threshold angle of 80 degrees for example. The same applies mutatis mutandis to the orientation change between FIGS. 7A and 7B, and between FIGS. 8A and 8B. With respect to the second rotation, it is depicted by the orientation change between any one of FIG. 6B to 6C, FIG. 7B to 7C, and FIG. 8B to 8C. In such figures, the second rotation brings the asset tracker to the same orientation as in the respective FIG. 6A, 7A, or 8A.

In some implementations, the activation detection module comprises a proximity sensor and detecting the activation trigger activity comprises detecting, by the proximity sensor 250, a loss of proximity between the asset tracker 200 and a proximity object 252 disposed in a packaging such as the shipping box 1300 of the asset tracker 200. As discussed above, in some implementations the loss of proximity needs to persist for a duration that exceeds a loss of proximity threshold in order to trigger an activation of the asset tracker and transitioning to the motion detection mode.

In some implementations, the proximity sensor comprises a Hall Effect sensor.

Figure 15A:
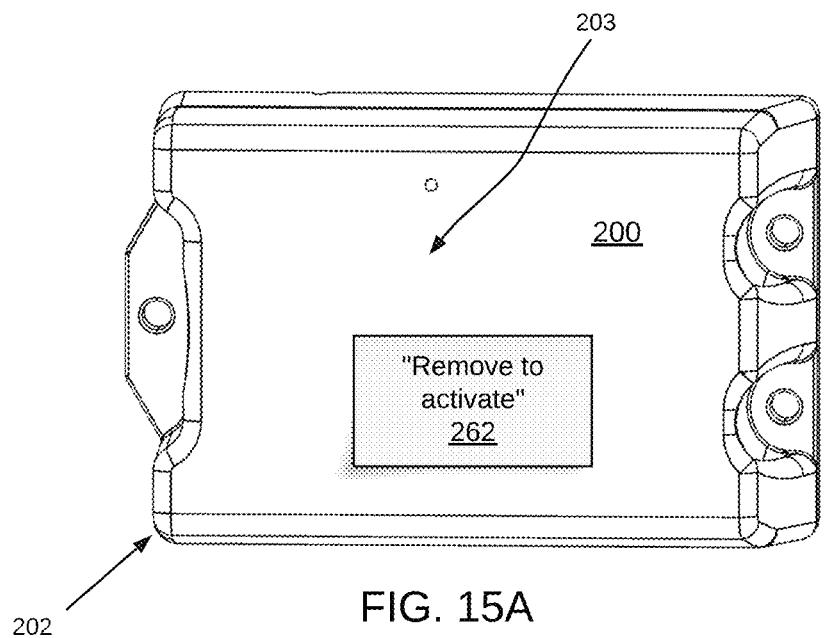
FIG. 15A is a top plan view of an exemplary asset tracker having an optical sensor covered by a sticker on a top housing thereof.
Figure 15B:
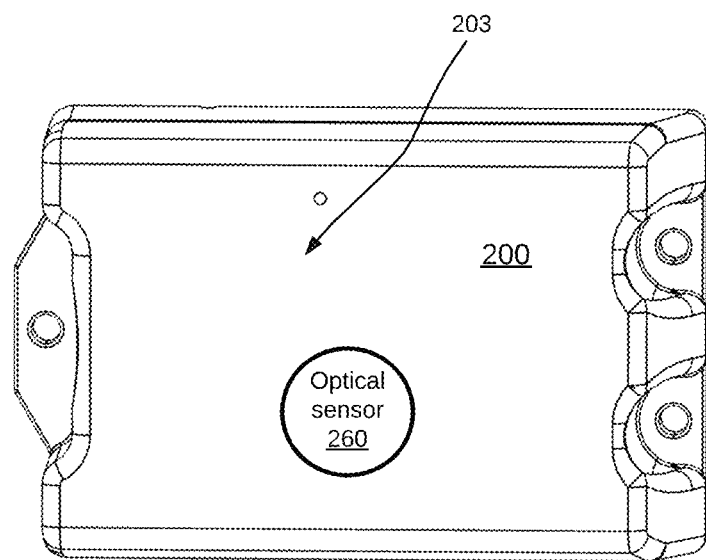
FIG. 15B is a top plan view of the exemplary asset tracker of FIG. 15A with the sticker removed and the optical sensor exposed to ambient or incident light.

In another implementation, the asset tracker 200 utilizes an optical sensor for activation. Specifically, the asset tracker 200 transitions from shipping mode 410 to motion detection mode 420 in response to detecting, by an optical sensor, ambient light. For example, with reference to FIG. 15B, the asset tracker 200 has an optical sensor 260 disposed on the top housing surface 203 of the housing 202 thereof. The asset tracker 200 ships in shipping mode 410 with the optical sensor 260 covered by an optical sensor cover such as the sticker 262 as shown in FIG. 15C. In some implementations, the sticker 262 contains an activation instruction message, such as "Remove to activate".

To activate the asset tracker 200, the optical sensor cover, such as the sticker 262 is removed. In response to the removal of the optical sensor cover, the optical sensor 260 detects incident light. The optical sensor 260 notifies the controller 230 of the incident light detection. In response to the incident light detection, the controller 230 executes machine-executable programming instructions which configure the asset tracker 200 to transition from the shipping mode 410 to the motion detection mode 420. In some implementations the machine-executable programming instructions configure the asset tracker 200 to transition from the shipping mode 410 to the motion detection mode 420 when the optical sensor 260 detects incident light for at least a predetermined duration.

Figure 16:
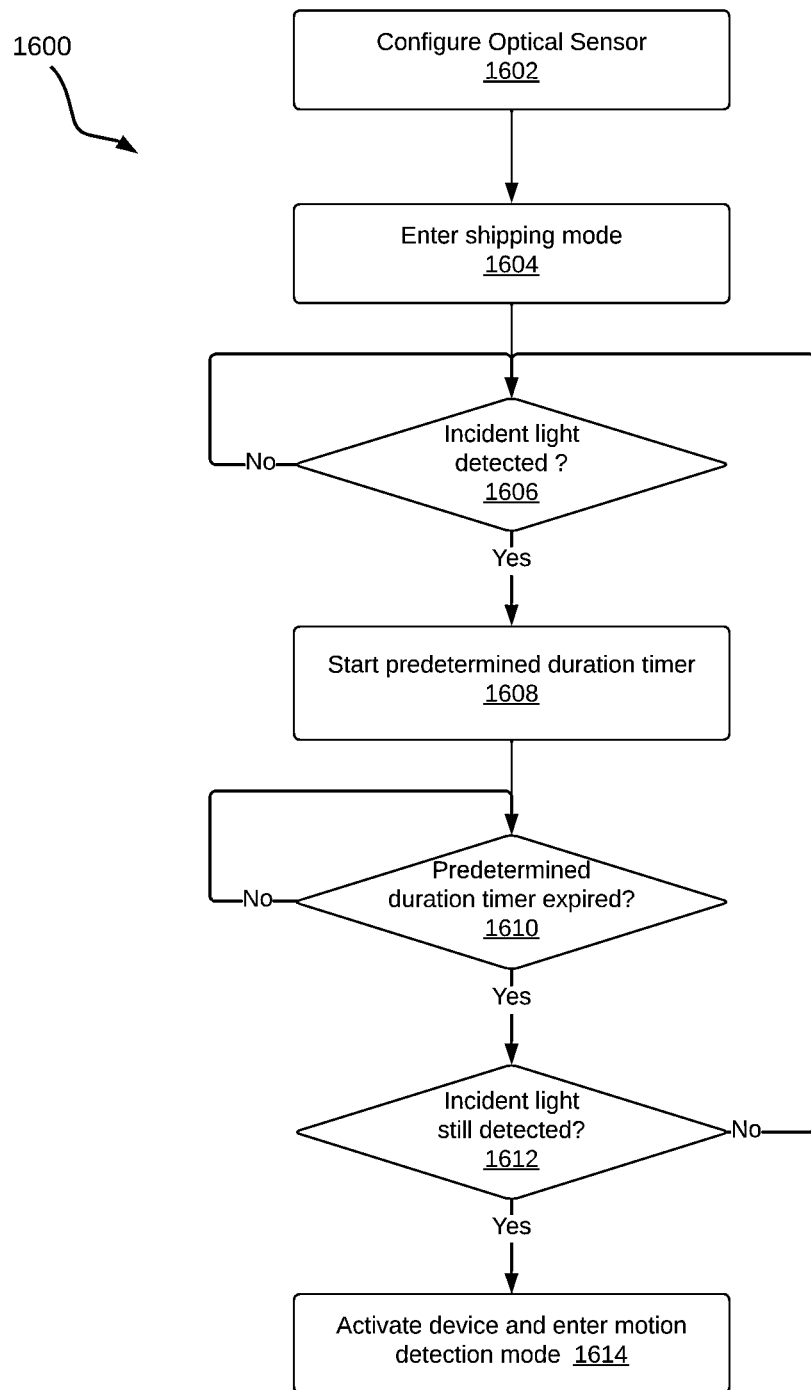
FIG. 16 is a flowchart depicting a method of activating an asset tracker utilizing an optical sensor, in accordance with embodiments of the present disclosure.

FIG. 16 depicts a method 1600 of activating the asset tracker 200 in accordance with an implementation of the present disclosure.

At step 1602, the asset tracker 200 configures the optical sensor 260. For example, the asset tracker 200 may adjust a light sensitivity parameter of the optical sensor 260. In some implementations, the asset tracker 200 configures the optical sensor 260 to generate an event detectable by the controller 230 when the optical sensor 260 detects incident light.

At step 1604, the asset tracker enters shipping mode 410.

At step 1606, the asset tracker 200 checks whether the optical sensor 260 has detected incident light. In some implementations this step involves the controller 230 executing machine-executable programming instructions which poll the optical sensor 260 to determine whether the optical sensor 260 has detected incident light. In other implementations this step checks whether the optical sensor 260 has generated an event such as an interrupt to the controller 230 indicating that the optical sensor 260 has detected incident light. If the optical sensor 260 has not detected incident light, control stays in step 1606. If the optical sensor 260 has detected incident light, control goes to step 1608.

In the method 1600 the asset tracker 200 transitions from the shipping mode 410 to the motion detection mode 420 when the optical sensor 260 detects incident light for a predetermined duration. This has the advantage of eliminating a false positive case when the optical sensor cover is accidentally and/or temporarily removed exposing the optical sensor 260. In the depicted implementation, the asset tracker 200 utilizes a timer to track the duration for which the asset tracker 200 detects incident light. At step 1608, the asset tracker 200 starts a predetermined duration timer. The timer may be a hardware timer that is integral to the controller 230 or may be a software timer implemented by machine-executable programming instructions. The timer is configured to run as a one shot (non-periodic) timer that, upon expiry, notifies the controller 230 that the predetermined duration has expired.

At step 1610 the asset tracker 200 checks whether the predetermined duration has expired. In some implementations, the controller 230 executes machine-executable programming instructions, which check whether the predetermined duration timer has expired. In other implementations, the timer generates an event with the controller 230 when it has expired. If the predetermined duration timer has not expired, control stays in step 1610. When the predetermined duration has expired control goes to step 1612.

Upon the expiry of the predetermined duration, at step 1612, the asset tracker 200 checks whether the incident light is still detected by the optical sensor 260. If the incident light is still detected after the expiry of the predetermined duration then control goes to step 1614. If the incident light is not detected after the expiry of the predetermined duration, then control goes back to step 1606.

At step 1614 the asset tracker 200 is activated and transitions to the motion detection mode 420.

Figure 17A:
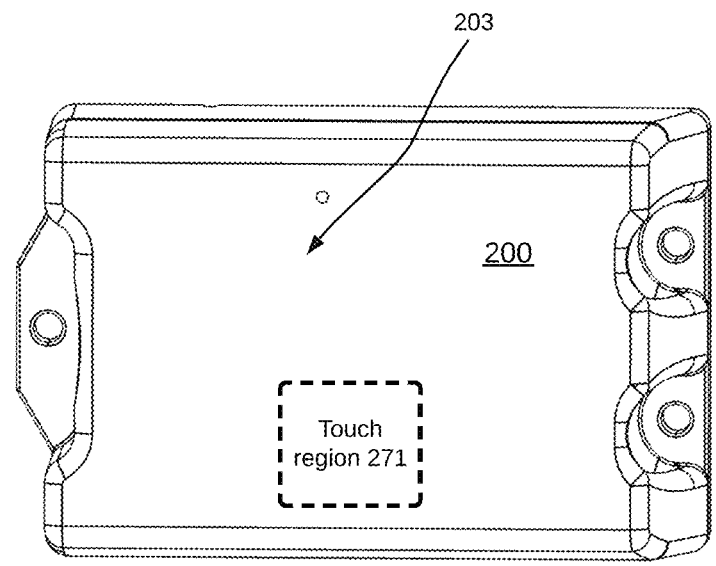
FIG. 17A is a top plan view of an exemplary asset tracker having a touch region on a top housing surface thereof, in accordance with embodiments of the present disclosure.
Figure 17B:
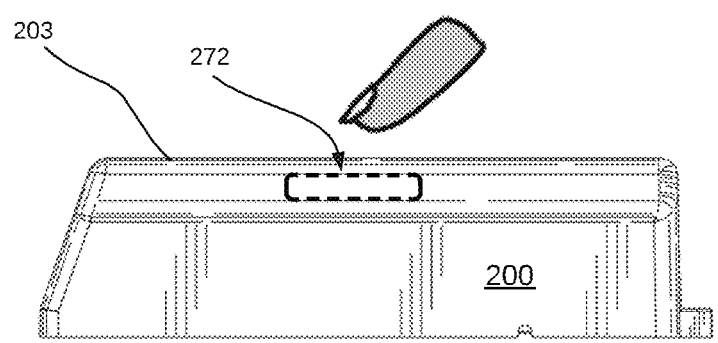
FIG. 17B is a side elevation view of the exemplary asset tracker of FIG. 17A showing the touch region location.

In yet another implementation, the asset tracker 200 uses a touch sensor 270 for activation and transitioning from shipping mode 410 to the motion detection mode 420. As shown in FIG. 17A, the touch sensor 270 creates a virtual key or touch region 271 on the surface of the housing of the asset tracker 200. The touch sensor 270 can be activated by an operator touching the touch region 271. The touch region 271 is defined by a touch sensor electrode 272 placed beneath the top housing surface 203 of the asset tracker 200.

Figure 18:
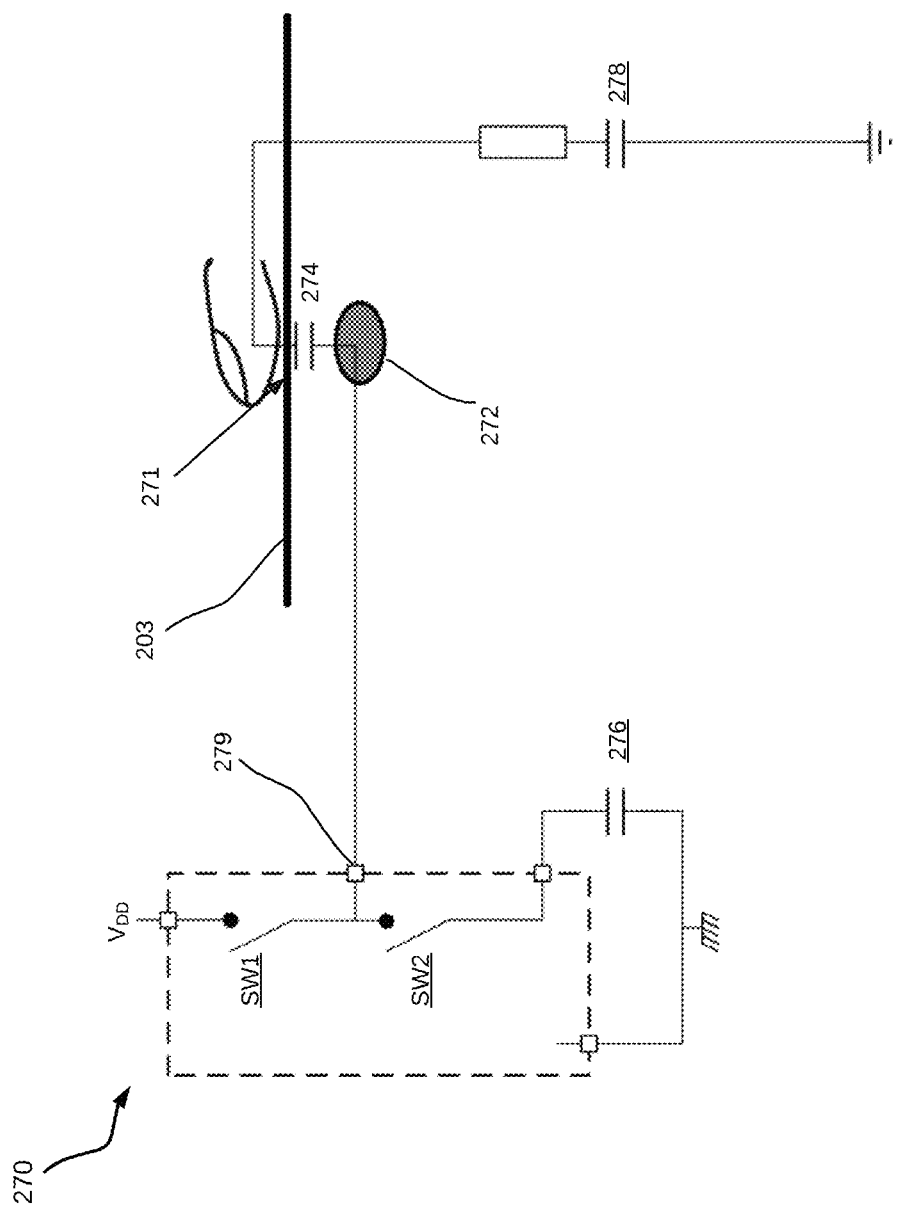
FIG. 18 is a circuit diagram for illustrating the operation of the touch region of FIG. 17A and FIG. 17B.

FIG. 18 depicts the theory of operation of the touch sensor 270. The touch sensor 270 includes a touch sensor electrode 272, a sensor capacitor 274, a sampling capacitor 276, a first switch SW1, and a second switch SW2. The touch sensor 270 may be an external component or an integral component of the controller 230.

The touch sensor electrode 272 is made of a conductive material and is placed under the top housing surface 203. The touch sensor electrode 272 provides a sensor capacitor 274 between the touch sensor electrode 272 and the top housing surface 203.

The sampling capacitor 276 can be charged from the sensor capacitor 274 and provides an input voltage that can be detected by an input pin such as an input pin of the controller 230.

The first switch SW1 is an electronic switch which connects the point 279 to VDD when closed.

The second switch SW2 is an electronic switch which connects the point 279 to the sampling capacitor 276.

Firstly we consider the case where no human finger is touching the touch region 271. When the first switch SW1 is closed, current charges the sensor capacitor 274. When the first switch SW1 is open and the second switch SW2 is closed, the sensor capacitor 274 discharges into the sampling capacitor 276. Since the sensor capacitor 274 is small (i.e., in the order of picoFarads), the voltage at the point 279 is at a logic LOW value.

Secondly, we consider the case where a human finger is touching the touch region 271. In this case, there is a human body coupling to earth represented by the human body capacitor 278. The human body capacitor 278 is in parallel with the sensor capacitor 274. When SW1 is closed, the sensor capacitor 274 and the human body capacitor 278 are charged. When SW1 is opened and SW2 is closed both the sensor capacitor 274 and the much larger human body capacitor 278 discharge into the sampling capacitor 276. The voltage on the sampling capacitor rises above the input voltage HIGH value (VIH) and can be detected by a controller 230 connected to the point 279.

Figure 19:
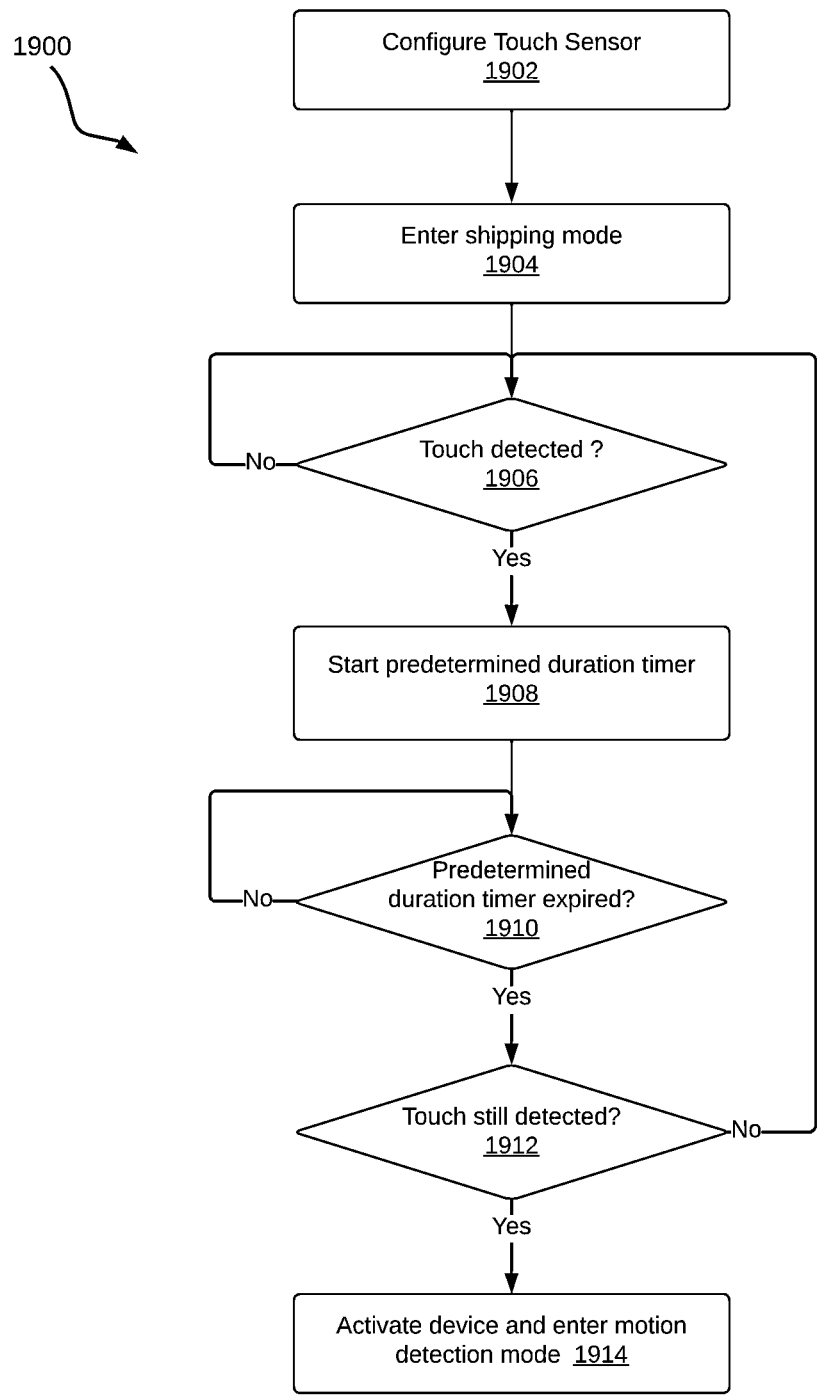
FIG. 19 is a flowchart depicting a method for activating an asset in response to a touch detection activity, in accordance with embodiments of the present disclosure.

In order to prevent accidental activation of the asset tracker 200 upon an accidental touching of the touch region, the asset tracker 200 may require the touch region 271 to be touched for a predetermined duration before activation commences. FIG. 19 depicts a method 1900 by an asset tracker for activating a motion detection mode 420, in accordance with an implementation of the present disclosure.

At step 1902, the asset tracker 200 configures the touch sensor 270. The touch sensor 270 may be configured to periodically close the switch SW1 (and open the switch SW2) to charge the sensor capacitor (and a human body capacitor 278), then open the switch SW2 (and close the switch SW1) to transfer the charge from the sensor capacitor 274 (and a human body capacitor if applicable) to the sampling capacitor 276.

At step 1904, the asset tracker 200 enters the shipping mode 410.

At step 1906, the asset tracker 200 checks whether a touch has been detected on the touch region 271. Checking whether a touch has been detected may be by checking the voltage on the sampling capacitor 276 and whether it is logic LOW or logic HIGH. If the voltage on the sampling capacitor is LOW, control remains at step 1906. If the voltage on the sampling capacitor 276 is HIGH, control goes to step 1908.

At step 1908, the asset tracker 200 starts a timer that expires after a predetermined duration ("a predetermined duration timer").

At step 1910, if the predetermined duration timer has not expired, control remains at step 1910. Conversely, if the predetermined duration timer has expired, control goes to step 1912.

At step 1912, the asset tracker 200 checks whether the touch sensor 270 still detects a human finger touch on the touch region 271. For example, the asset tracker 200 may execute machine-executable programming instructions which check the voltage on the sampling capacitor 276. If the human finger touch is still detected, control goes to step 1914. If a human finger touch is not detected, then control goes back to step 1906. In the latter case it is assumed that the previous touch detected at step 1906 was accidental and not intended to activate the asset tracker 200.

At step 1914, the asset tracker 200 is activated and transitions from shipping mode 410 to motion detection mode 420.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method for activating an asset tracker including a housing for enclosing internal components of the asset tracker, the internal components including a controller, an inertial measurement unit, and at least one peripheral, the method comprising:

operating the controller of the asset tracker is in low-power mode;

maintaining the at least one peripheral in a powered off state;

configuring an activation detection module of the asset tracker for detecting an activation trigger activity; and in response to detecting the activation trigger activity, activating a motion detection mode of the asset tracker for detecting a sustained motion for a predetermined duration;

wherein:

the activation detection module comprises the inertial measurement unit; and configuring the activation detection module for detecting the activation trigger activity comprises configuring the inertial measurement unit for detecting at least one tapping activity in a direction of an axis substantially perpendicular to a surface of the housing; and detecting the activation trigger activity comprises detecting, by the inertial measurement unit, the at least one tapping activity on the surface of the housing.

2. The method of claim 1, wherein activating the motion detection mode comprises configuring the inertial measurement unit for detecting the sustained motion for the predetermined duration.

3. The method of claim 2, wherein the inertial measurement unit comprises a 3-axis accelerometer and configuring the inertial measurement unit for detecting the sustained motion comprises configuring the 3-axis accelerometer to notify the controller when the 3-axis accelerometer detects an acceleration value above an acceleration threshold for the predetermined duration.

4. The method of claim 1, wherein the at least one tapping activity comprises a first tapping activity and a second tapping activity spaced in time from the first tapping activity.

5. The method of claim 4, wherein the first tapping activity and the second tapping activity each comprises a double tap on the surface of the housing.

6. The method of claim 1, wherein:

the activation detection module comprises the inertial measurement unit; and detecting the activation trigger activity comprises detecting at least one mid-air gesture.

7. The method of claim 6, wherein:

the at least one mid-air gesture comprises a first mid-air gesture and a second mid-air gesture different from the first mid-air gesture; and configuring the activation detection module for detecting the activation trigger activity comprises:

configuring the inertial measurement unit for detecting the first mid-air gesture; and configuring the inertial measurement unit for detecting the second mid-air gesture in response to detecting the first mid-air gesture.

8. The method of claim 7, wherein:

configuring the inertial measurement unit for detecting the first mid-air gesture comprises configuring the inertial measurement unit for detecting at least one orientation change along a first axis of the asset tracker; and configuring the inertial measurement unit for detecting the second mid-air gesture comprises configuring the inertial measurement unit for detecting at least one orientation change along a second axis of the asset tracker.

9. The method of claim 8, wherein the at least one orientation change comprises:

a first rotation, from an initial orientation, by a first angle exceeding a particular threshold angle around the respective axis; and a second rotation by a second angle exceeding the particular angle threshold back to the initial orientation.

10. A method for activating an asset tracker including a housing for enclosing internal components of the asset tracker, the internal components including a controller, an inertial measurement unit, and at least one peripheral, the method comprising:

operating the controller of the asset tracker is in low-power mode;

maintaining the at least one peripheral in a powered off state;

configuring an activation detection module of the asset tracker for detecting an activation trigger activity; and in response to detecting the activation trigger activity, activating a motion detection mode of the asset tracker for detecting a sustained motion for a predetermined duration;

wherein:

the activation detection module comprises a proximity sensor; and detecting the activation trigger activity comprises detecting, by the proximity sensor, a loss of proximity between the asset tracker and a proximity object disposed in a packaging of the asset tracker; and wherein the proximity sensor comprises a Hall Effect sensor and the proximity object comprises a magnet.

11. An asset tracker, comprising:

a housing;

a controller disposed in the housing;

an activation detection module disposed in the housing and coupled to the controller;

a location module disposed in the housing and coupled to the controller;

an inertial measurement unit disposed in the housing and coupled to the controller; and a memory coupled to the controller, the memory storing machine-executable programming instructions which, when executed by the controller, configure the asset tracker to:

operate the controller of the asset tracker is in low-power mode maintain the location module in a powered off state;

configure the activation detection module of the asset tracker to detect an activation trigger activity; and in response to detecting the activation trigger activity, configure the inertial measurement unit to detect a sustained motion for a predetermined duration, wherein:

the activation detection module comprises the inertial measurement unit; and the machine-executable programming instructions which configure the activation detection module to detecting the activation trigger activity comprise machine-executable programming instructions which configure the inertial measurement unit to detect at least one tapping activity in a direction of an axis substantially perpendicular to a surface of the housing.

12. The asset tracker of claim 11, wherein:

the activation detection module comprises the inertial measurement unit; and the machine-executable programming instructions which configure the activation detection module to detect the activation trigger activity comprise machine-executable programming instructions which configure the inertial measurement unit to detect at least one mid-air gesture.

13. The asset tracker of claim 12, wherein:
the at least one mid-air gesture comprises a first mid-air gesture and a second mid-air gesture different from the first mid-air gesture; and
the machine-executable programming instructions which configure the inertial measurement unit to detect the at least one mid-air gesture comprise machine-executable programming instructions which:
 configure the inertial measurement unit to detect the first mid-air gesture; and
 in response to detecting the first mid-air gesture, configure the inertial measurement unit to detect the second mid-air gesture.

14. The asset tracker of claim 13, wherein:
the machine-executable programming instructions which configure the inertial measurement unit to detect the first mid-air gesture comprise machine-executable programming instructions which configure the inertial measurement unit to detect at least one orientation change along a first axis of the asset tracker; and
the machine-executable programming instructions which configure the inertial measurement unit to detect the second mid-air gesture comprise machine-executable programming instructions which configure the inertial measurement unit to detect at least one orientation change along a second axis of the asset tracker.

15. The asset tracker of claim 14, wherein the at least one orientation change comprises:
a first rotation, from an initial orientation, by a first angle exceeding a particular threshold angle around the respective axis; and
a second rotation by a second angle exceeding the particular angle threshold back to the initial orientation.

\* \* \* \* \*